United States Patent
Tsujimoto

(10) Patent No.: US 10,411,758 B2
(45) Date of Patent: Sep. 10, 2019

(54) DRIVE CONTROL APPARATUS THAT RECEIVES POWER AND A PLURALITY OF FREQUENCY-MULTIPLEXED CONTROL SIGNALS

(71) Applicant: OSAKA CITY UNIVERSITY, Osaka (JP)

(72) Inventor: Hiroaki Tsujimoto, Osaka (JP)

(73) Assignee: OSAKA CITY UNIVERSITY, Osaka (JP)

( * ) Notice: Subject to any disclaimer, the term of this patent is extended or adjusted under 35 U.S.C. 154(b) by 218 days.

(21) Appl. No.: 15/528,477

(22) PCT Filed: Aug. 26, 2015

(86) PCT No.: PCT/JP2015/004303
§ 371 (c)(1),
(2) Date: Jun. 23, 2017

(87) PCT Pub. No.: WO2016/079910
PCT Pub. Date: May 26, 2016

(65) Prior Publication Data
US 2017/0324445 A1   Nov. 9, 2017

(30) Foreign Application Priority Data
Nov. 21, 2014   (JP) .................. 2014-236536

(51) Int. Cl.
*H04J 1/00* (2006.01)
*H04B 3/54* (2006.01)
(Continued)

(52) U.S. Cl.
CPC .............. *H04B 3/54* (2013.01); *H04B 3/56* (2013.01); *H04Q 9/00* (2013.01); *H04J 1/00* (2013.01)

(58) Field of Classification Search
CPC ................................. H04B 3/54; H04B 3/56
See application file for complete search history.

(56) References Cited

U.S. PATENT DOCUMENTS 8,634,216 B2 *   1/2014   Chapman .......... H02M 3/33523
                                                       363/71
2013/0334872 A1   12/2013   Kodama et al.
(Continued)

FOREIGN PATENT DOCUMENTS

JP   2006340009 A   12/2006
JP   H08033068 A    2/2017
(Continued)

OTHER PUBLICATIONS

International Search Report for PCT/JP2015/004303, dated Oct. 20, 2015, and its English translation provided by WIPO.
(Continued)

Primary Examiner — Maharishi V Kirodhar
(74) Attorney, Agent, or Firm — Ladas & Parry, LLP

(57) ABSTRACT

According to an aspect of the present invention, a drive control system is provided that includes a transmitting apparatus and a plurality of drive control apparatuses and drives and controls a plurality of devices to be controlled, wherein the transmitting apparatus includes: a control information addition apparatus that frequency-multiplexes a plurality of control signals, and an electric wire that supplies power and the plurality of control signals to the plurality of drive control apparatuses.

24 Claims, 13 Drawing Sheets

(51) Int. Cl.
*H04B 3/56* (2006.01)
*H04Q 9/00* (2006.01)

(56) References Cited

U.S. PATENT DOCUMENTS

2016/0041209 A1* 2/2016 Tsujimoto ............... H01L 43/08
                                                    324/228
2016/0223595 A1  8/2016 Tsujimoto

FOREIGN PATENT DOCUMENTS

| WO | 2012/120906 A1 | 9/2012 |
| WO | 2014/162730 A1 | 10/2014 |
| WO | 2015/056397 A1 | 4/2015 |

OTHER PUBLICATIONS

Written Opinion of the International Search Authority PCT/JP2015/004303 dated Oct. 20, 2015, and its English translation provided by Bing.Com Microsoft Translate.

\* cited by examiner

DRIVE CONTROL APPARATUS THAT RECEIVES POWER AND A PLURALITY OF FREQUENCY-MULTIPLEXED CONTROL SIGNALS

CROSS-REFERENCE TO RELATED APPLICATIONS

The present application is the U.S. national phase of International Application No. PCT/JP2015/004303 filed on Aug. 26, 2015, which claims priority to Japanese Patent Application No. 2014-236536 filed on Nov. 21, 2014, the disclosures of which are incorporated herein by reference.

TECHNICAL FIELD

The present invention relates to a drive control apparatus that controls one or more devices to be controlled that are coupled to a power line by using power line communication, and a drive control system that has the drive control apparatus.

BACKGROUND ART

In recent years, power line communication (hereinafter also referred to as "PLC") that performs communication by superimposing information on a power line has been proposed. This is a technique that uses a power line as a wired communication line by attaching a modem that superimposes information on the power line to the power line. By using a power line as a communication line, it is possible to reduce a large number of wires in a wired communication system that requires a normal power line and a communication line.

On the other hand, the PLC has a problem that other apparatuses are affected by superimposing information on a power source current. However, the PLC is useful in a closed environment where a power line is scheduled to be used as a communication line. For example, it is proposed to arrange a power line communication system in a closed space such as a marine vessel (Patent Literature 1). Further, it is also proposed to control lighting in one building by the PLC (Patent Literature 2).

In the PLC proposed in Patent Literatures 1 and 2, a unique address is provided to each terminal (an object to be communicated with) and information is transmitted and received by time-division multiplexing the information.

CITATION LIST

Patent Literature

Patent Literature 1: JP 08-033068 A
Patent Literature 2: JP 2006-340009 A

SUMMARY OF INVENTION

Technical Problem

As objects that can enjoy an effect that the number of wires can be reduced by performing the PLC, there are in-vehicle electrically-powered equipment such as a power window and a power fender mirror and drive control of a robot. In drive control of such drive systems, a plurality of motors (devices to be controlled) are connected to one power supply and a predetermined operation is performed by an instruction from an instruction module. Therefore, for these motors, wires are required respectively for power to drive the motors and a control signal indicating how much and when the motors should be moved. It is considered that applying a PLC technique to the above is effective because the PLC technique can reduce the number of wires.

However, if an individual address is provided to each motor as in related art and control is performed, an interface for identifying an address is required for each motor. In this case, when performing communication, an address analysis is required, so that it takes time from when a control signal is transmitted to when a device to be controlled operates. For example, when controlling lighting or the like, there is no problem even if it takes time from when a drive control signal is transmitted to when a device to be controlled performs an operation. However, it is required for a robot, electrically-powered equipment of a vehicle, and the like to quickly perform an operation when a drive control signal is transmitted. Further, when a plurality of communication channels are provided to a power line in a frequency multiplexing system, a frequency discriminator is required for each device to be controlled.

Further, a ring-shaped core is normally used for a coupling element to draw information from the PLC. However, such a core has a large physical volume. Therefore, the size of the entire apparatus becomes large.

Regarding drive control of a drive system where devices to be controlled such as motors are connected to one power supply and controlled, it is required to downsize the entire system. However, for a time-division multiplexing system where an address is provided for each device to be controlled and the frequency multiplexing system where a frequency discriminator is required for each device to be controlled as described above, it is difficult to downsize the entire system.

Solution to Problem

According to one aspect of the present invention, there is provided a drive control apparatus that receives power and a plurality of frequency-multiplexed control signals through an electric wire and drives and controls a device to be controlled, wherein a detection frequency is set in the device to be controlled, one of the plurality of control signals is a control signal corresponding to the device to be controlled and a frequency of the control signal is close to the detection frequency, and the drive control apparatus comprising: a driver that drives the device to be controlled by using the power, a detection current generator that generates a rectangular-wave detection current whose frequency is the detection frequency, a magnetic field response element in which the detection current flows, an impedance of the magnetic field response element varying in response to a magnetic field generated around the electric wire, and a signal processor that detects the control signal corresponding to the device to be controlled from an output from the magnetic field response element and controls the device to be controlled based on the detected control signal.

The control signal is detected by using the magnetic field response element whose impedance varies in response to the magnetic field generated around the electric wire, so that it is possible to downsize the drive control apparatus. Further, it is possible to reduce the power consumption of the drive control apparatus by generating a rectangular-wave detection current.

According to one aspect of the present invention, there is provided A drive control apparatus that receives power and a plurality of frequency-multiplexed control signals through an electric wire and drives and controls a first to an nth (n is an integer greater than or equal to 2) devices to be controlled, wherein a first to an nth detection frequencies different from each other are set in the first to the nth devices to be controlled, respectively, a first to an nth control signals of the plurality of control signals correspond to the first to the nth devices to be controlled, respectively, a frequency of the kth (k is an integer greater than or equal to 1 and smaller than or equal to n) control signal is close to a kth detection frequency, the drive control apparatus comprising: a driver that drives the first to the nth devices to be controlled by using the power, a detection current generator that generates a detection current whose frequency is the first to the nth detection frequencies, a magnetic field response element in which the detection current flows, an impedance of the magnetic field response element varying in response to a magnetic field generated around the electric wire, and a signal processor that detects the first to the nth control signals from an output from the magnetic field response element and controls the first to the nth devices to be controlled based on the detected first to nth control signals, respectively.

The control signal is detected by using the magnetic field response element whose impedance varies in response to the magnetic field generated around the electric wire, so that it is possible to downsize the drive control apparatus.

It is desirable that the detection current generator generates a detection current whose frequency is the first to the nth detection frequencies in a time-division manner, and the signal processor detects the kth control signal when a detection current whose frequency is the kth detection frequency is generated.

Thereby, it is possible to detect a plurality of control signals.

More desirably, the signal processor detects the first to the nth control signals in a time-division manner and adjusts control timing of the first to the nth devices to be controlled.

Thereby, it is possible to control a plurality of devices to be controlled at an appropriate timing even when a plurality of control signals are sequentially detected in a time-division manner.

It is desirable that the detection current generator generates the detection current of a rectangular wave.

Thereby, it is possible to reduce the power consumption of the drive control apparatus.

As a specific example, the magnetic field response element generates an output depending on a multiplication result of a current flowing through the electric wire and the detection current.

It is desirable that the signal processor detects the control signal by performing digital signal processing.

Thereby, even when noise is included in an output from the magnetic field response element, it is possible to reduce influence of the noise. In particular, when the detection current is a rectangular wave, it is effective because noise due to a higher harmonic component included in the rectangular wave can be suppressed.

It is desirable that the signal processor comprises: a low-pass filter that extracts a low frequency component from the output from the magnetic field response element, and an AD converter that converts an output from the low-pass filter into a digital signal.

More desirably, the device to be controlled is controlled according to a frequency of the control signal, and the signal processor detects the frequency of the control signal by measuring a pulse interval of an output from the AD converter.

It is desirable that the output from the magnetic field response element comprises: a component whose frequency is sum of the detection frequency of the detection current flowing through the magnetic field response element and each of the frequencies of the plurality of control signals, and a component whose frequency is difference between the detection frequency of the detection current flowing through the magnetic field response element and each of the frequencies of the plurality of control signals, and the signal processor comprises a low-pass filter that mainly extracts a lowest frequency component from the output from the magnetic field response element.

Thereby, it is possible to extract a control signal of a specific frequency from a plurality of control signals whose frequencies are different from each other.

According to another aspect of the present invention, there is provided a drive control system comprising: the above mentioned drive control apparatus; and a transmitting apparatus comprising a control information addition apparatus and an electric wire, the control information addition apparatus frequency-multiplexing the plurality of control signals, the electric wire supplying power and the plurality of control signals to the drive control apparatus.

According to still another aspect of the present invention, there is provided a drive control system that comprises a transmitting apparatus and a plurality of drive control apparatuses and drives and controls a plurality of devices to be controlled, wherein the transmitting apparatus comprises: a control information addition apparatus that frequency-multiplexes a plurality of control signals, and an electric wire that supplies power and the plurality of control signals to the plurality of drive control apparatuses, detection frequencies different from each other are set in the plurality of devices to be controlled, respectively, the plurality of control signals correspond to the plurality of devices to be controlled, respectively, a frequency of each of the plurality of control signals is close to a detection frequency set in a corresponding device to be controlled, each of the plurality of drive control apparatuses drives and controls a target device among the plurality of devices to be controlled and comprises: a driver that drives the target device by using the power, a detection current generator that generates a detection current whose frequency is a detection frequency set in the target device, a magnetic field response element in which the detection current flows, an impedance of the magnetic field response element varying in response to a magnetic field generated around the electric wire, and a signal processor that detects the control signal corresponding to the target device based on an output from the magnetic field response element and controls the target device based on the detected control signal, and a detection frequency of a detection current generated by the detection current generator in one drive control apparatus among the plurality of drive control apparatuses is different from a detection frequency of a detection current generated by the detection current generator in another drive control apparatus among the plurality of drive control apparatuses.

Advantageous Effects of Invention

A magnetic field response element such as a magnetic element can measure a current flowing through an electric wire when the magnetic field response element receives a magnetic field generated by the current flowing through the electric wire while a current is being flown through the magnetic field response element. Further, when a current of a specific frequency is flown through the magnetic field response element such as a magnetic element, even when a plurality of frequencies are multiplexed on the electric wire, the magnetic field response element can detect only a current of a specific frequency. Thus, it is possible to configure a frequency discriminator by only a magnetic field response element such as a magnetic element and a current source that flows a specific frequency through the magnetic field response element such as a magnetic element.

The drive control apparatus according to the present invention uses the magnetic field response element such as a magnetic element as an element for reception, so that it is possible to substantially downsize an apparatus required to receive information. Further, it is possible to reduce the number of wires by using PLC. Therefore, the drive control apparatus according to the present invention can downsize the entire system.

BRIEF DESCRIPTION OF DRAWINGS

FIG. 5 is a block diagram illustrating an example of an internal configuration of a drive control apparatus 120a.

DESCRIPTION OF EMBODIMENTS

Hereinafter, embodiments of the present invention will be described with reference to the drawings. The description below is illustration of the embodiments of the present invention and the embodiments are not limited to the description below. The embodiments below can be modified without departing from the scope of the present invention.

First Embodiment

Figure 1:
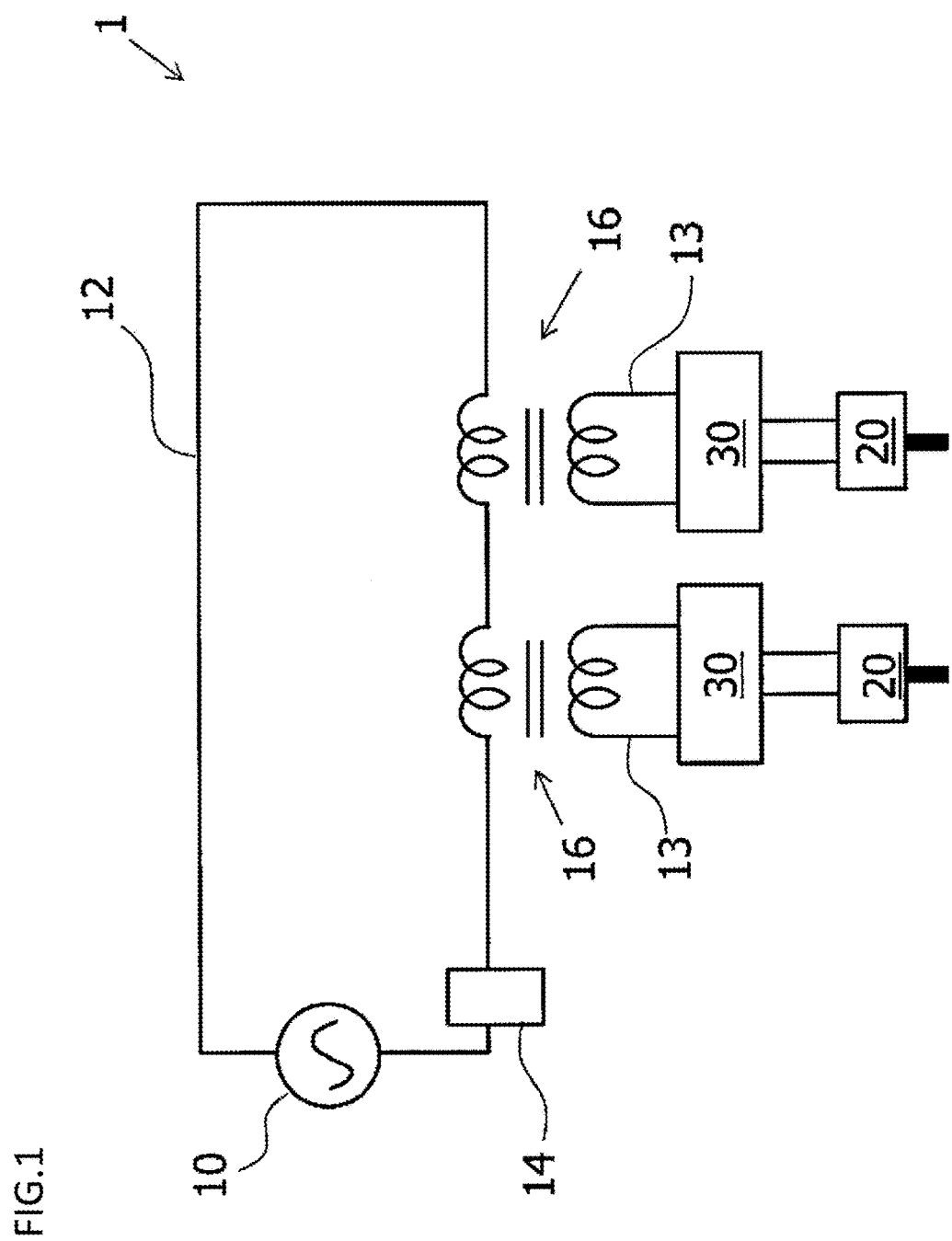
FIG. 1 is a diagram illustrating an entire configuration of a drive control system according to the present invention.

FIG. 1 illustrates a configuration of a drive control system 1 using a drive control apparatus 30 according to a first embodiment. The drive control system 1 has a power supply 10, an electric wire 12, and a control information addition apparatus 14 that superimposes a control signal (hereinafter also simply referred to as control information) including control information on the electric wire 12. The electric wire 12 is connected with one or more devices to be controlled 20 and drive control apparatuses 30 through transformers 16. Electric wires located on the side of the devices to be controlled 20 as seen from the transformers 16 are denoted by reference numeral 13.

The power supply 10 supplies power to each device to be controlled 20. The power supply 10 may be single phase or multiple phase (three-phase) AC. Here, a frequency of current supplied by the power supply 10 is called "power frequency".

The control information addition apparatus 14 superimposes a control signal for controlling each device to be controlled 20 on the electric wire 12. A configuration of the control information addition apparatus 14 is not particularly limited. This is because the control information addition apparatus 14 may be arranged close to the power supply 10 and therefore the size of the control information addition apparatus 14 can be large to some extent. "Power supply side" as seen from the device to be controlled 20 and the drive control apparatus 30 indicates the power supply 10 and the control information addition apparatus 14.

The control information addition apparatus 14 superimposes a signal of a plurality of frequencies on a current flowing through the electric wire 12. The control information used at this time is a signal of frequency other than the power frequency. The frequency is called "control information frequency". The control information is information representing how each device to be controlled 20 is operated. A drive status of the device to be controlled 20 is controlled. For example, it is considered that the device to be controlled 20 has at least two statuses of ON and OFF.

That is, the control information is required to be able to transmit a plurality of statuses to the device to be controlled 20 that will be controlled. The drive control apparatus 30 according to the present invention can linearly restore amplitude of a signal of one frequency. Further, the drive control apparatus 30 can retrieve not only a signal of a specific frequency but also a signal of a specific bandwidth. Therefore, the control information is a signal of a frequency other than the power frequency and a signal of one frequency or a signal of a frequency in a specific band close to the one frequency.

As the device to be controlled 20, mainly a passive device that consumes power, such as a motor, a lighting, and a switch, is preferably used. The device to be controlled 20 may be a device that stores power, such as a battery. In other words, the drive control system 1 according to the present invention can be preferably used for an embodiment where the device to be controlled 20 is controlled from the power supply side. These devices to be controlled 20 perform a predetermined operation or exert a predetermined function when predetermined currents are respectively supplied to the devices to be controlled 20.

More specifically, the motor rotates by a predetermined angle, the lighting turns on or off, and the switch turns on or off. Further, the battery increases/decreases a charge or discharge amount. In this way, these devices to be controlled 20 transit among a plurality of statuses by using the supplied power.

Figure 2:
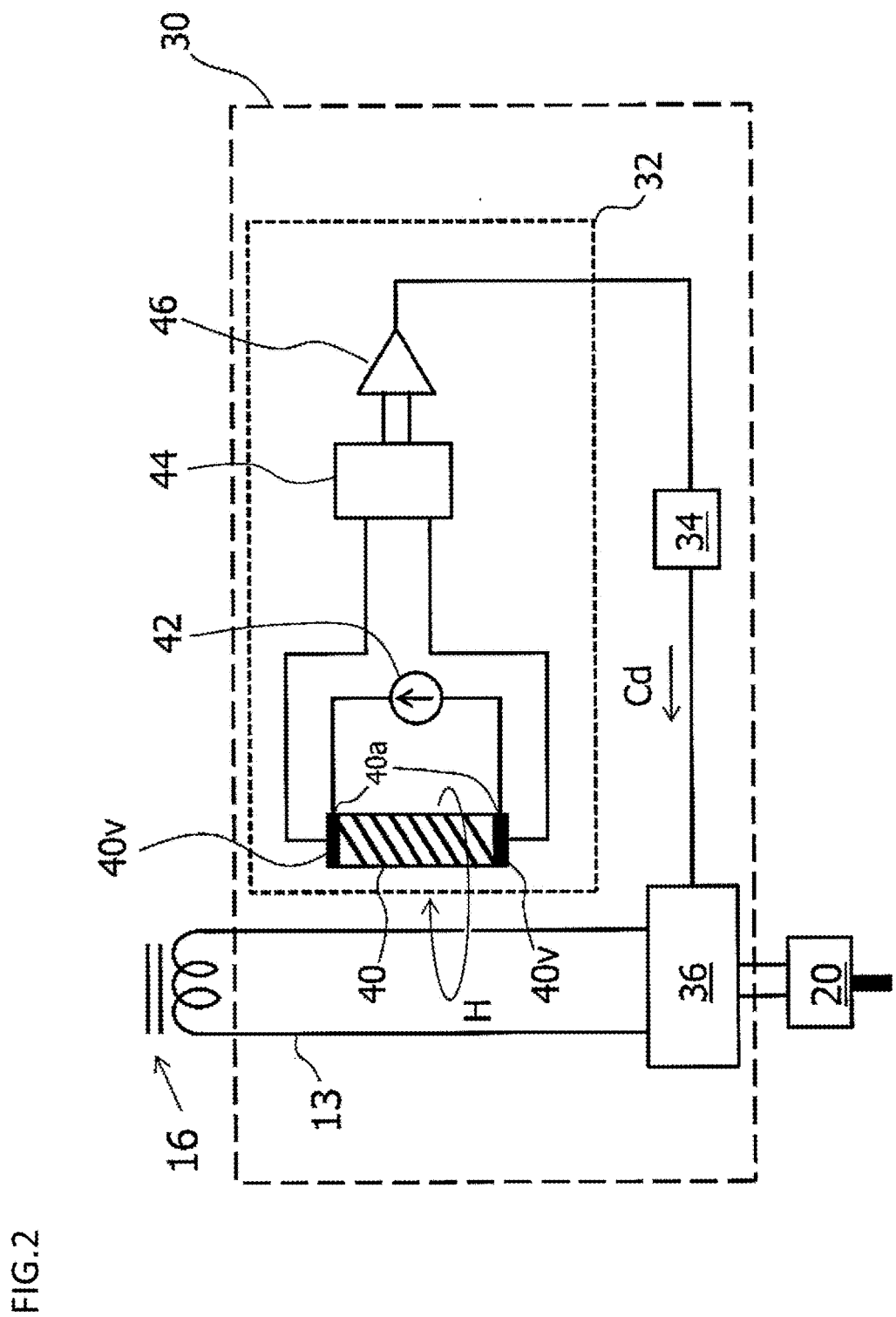
FIG. 2 is a diagram illustrating a configuration of a drive control apparatus.

FIG. 2 illustrates details of the drive control apparatus 30. The drive control apparatus 30 includes a receiver 32, an instruction device 34, and a drive current source 36. The receiver 32 includes a magnetic element 40, a detection current source 42, a filter 44, and an amplifier 46. The magnetic element 40 may be a magnetoresistive effect element that presents a magnetoresistive effect or may be a Hall element that presents a Hall effect. The element of either type is provided with a current terminal 40a for flowing a detection current and a voltage terminal 40v for extracting a voltage.

For example, when the magnetic element 40 is a magnetoresistive effect element, the current terminal 40a and the voltage terminal 40v may be the same portion. When the magnetic element 40 is a Hall element, orientations of the terminals of the current terminal 40a and the voltage terminal 40v are perpendicular to each other. In the following description, it is assumed that the magnetic element 40 is a magnetoresistive effect element.

The magnetic element 40 is formed by forming a nickel iron alloy (permalloy) film or the like on a strip-like substrate. The current terminal 40a and the voltage terminal 40v are formed on both terminals of the strip-like substrate in the longitudinal direction.

The detection current source 42 is connected to the current terminals 40a. The detection current source 42 is a current source for flowing a current (hereinafter referred to as "detection current") of a specific frequency (hereinafter referred to as "detection frequency") to the magnetic element 40. The detection current source 42 is desired to be a constant current source. However, the detection current source 42 may be a constant voltage source. The frequency (detection frequency) of the detection current supplied by the detection current source 42 to the magnetic element 40 is a frequency of control information demodulated from the electric wire 12 or a frequency close to the frequency of the control information.

For example, when the control information frequency is $f_1$ and the detection frequency is $f_d$, $|f_d - f_1| \leq f_c$ is established. Here, $f_c$ is a cut-off frequency of the filter 44. The detection current is a reference for determining a frequency band of a signal that can be received by the device to be controlled 20. Therefore, the detection frequency is set for each device to be controlled 20.

The filter 44 and the amplifier 46 are connected to the voltage terminals 40v. The magnetic element 40 through which the detection current flows operates as, so to speak, an arithmetic element that outputs a product of a current flowing through an electric wire 13 and the detection current.

Here, a signal that appears at the voltage terminal 40v of the magnetic element 40 will be described with reference to FIG. 2. Here, an electric resistance of the magnetic element 40 is $R_{mr}$, the detection current is $I_2$, and the current flowing through the electric wire 13 is $I_1$. A magnetic field H is generated around the electric wire 13 by the current $I_1$. The magnetic field H is proportional to the current $I_1$. When a proportional constant thereof is $\alpha$, the magnetic field H is represented by the formula (1).

$$H = \alpha * I_1 \quad (1)$$

It is assumed that the magnetic element 40 is a magnetoresistive effect element and a resistance change by the magnetic field H is $\Delta R_{mr}$. The resistance change $\Delta R_{mr}$ is proportional to the magnetic field H. When a proportional constant thereof is $\beta$, the resistance change $\Delta R_{mr}$ is represented by the formula (2).

$$\Delta R_{mr} = \beta * H \quad (2)$$

The current $I_2$ flows through the magnetic element 40, so that when a voltage change at the voltage terminal 40v of the magnetic element 40 is $\Delta V_{mr}$, the voltage change $\Delta V_{mr}$ is represented by the formula (3).

$$\Delta V_{mr} = \Delta R_{mr} * I_2 \quad (3)$$

When the formula (1) and the formula (2) are substituted into the formula (3) and formula (3) is arranged, the formula (4) is obtained.

$$\Delta V_{mr} = \alpha * \beta * I_1 * I_2 \quad (4)$$

In other words, a voltage that appears at both ends of the voltage terminals 40v appears as a product of the current $I_1$ flowing through the electric wire 13 and the current $I_2$ flowing through the magnetic element 40.

Signals of the power frequency and a plurality of control information frequencies are superimposed on the current $I_1$. The frequencies of the plurality of signals are represented by $f_{1,n}$. Here, n is an integer greater than or equal to zero. The power supply frequency is $f_{1,0}$. The detection frequency is $f_d$. Then, the current $I_1$ and the current $I_2$ are represented by the formula (5) and the formula (6), respectively.

$$I_1 = \sum_{n=0}^{\infty} I_{1,n} \sin(2\pi f_{1,n} t + \theta_n) \quad (5)$$

$$I_2 = I_2 \sin 2\pi f_d t \quad (6)$$

The voltage change $\Delta V_{mr}$ of the voltage terminal 40v is a product of the currents $I_2$ and $I_2$ (see the formula (4)), so that $\Delta V_{mr}$ is obtained by the formula (7). Here, $\alpha$, $\beta$, and $I_2$ are omitted because they are constants.

$$\Delta V_{mr} \propto I_{1,0}(\cos\{2\pi(f_{1,0} - f_d) + \theta_0\} - \cos\{2\pi(f_{1,0} + f_d) + \theta_0\}) + \quad (7)$$
$$I_{1,1}(\cos\{2\pi(f_{1,1} - f_d) + \theta_0\} - \cos\{2\pi(f_{1,1} + f_d) + \theta_0\}) +$$
$$I_{1,2}(\cos\{2\pi(f_{1,2} - f_d) + \theta_0\} - \cos\{2\pi(f_{1,2} + f_d) + \theta_0\}) + \ldots +$$
$$I_{1,n}(\cos\{2\pi(f_{1,n} - f_d) + \theta_0\} - \cos\{2\pi(f_{1,n} + f_d) + \theta_0\}) + \ldots$$

As seen from the formula (7), a signal of two frequencies $f_{1,n} - f_d$ and $f_{1,n} + f_d$ is generated from nth control information frequency $f_{1,n}$ that is superimposed on the electric wire 13.

As described above, a signal whose frequency is a difference and a sum of the frequency flowing through the electric wire 13 and the frequency of the detection current is outputted to the voltage terminal 40v. Among these, $f_{1,k} - f_d$ can be easily extracted from other control information by a low-pass filter. The filter 44 is connected for this purpose. The amplifier 46 amplifies a signal after the filter 44 so that the signal can be used by a post-stage circuit.

The instruction device 34 receives an output signal from the receiver 32 and issues an instruction of operation to the device to be controlled 20. The instruction of operation may be a power (current) according to the operation. Specifically, the instruction device 34 detects a frequency outputted from the receiver 32 and outputs an instruction signal Cd that causes the device to be controlled 20 to perform an operation according to the frequency. Alternatively, the instruction device 34 detects an amplitude of a signal outputted from the receiver 32 and outputs an instruction signal Cd that causes the device to be controlled 20 to perform an operation according to the amplitude. That is, the instruction signal Cd may be based on the frequency of the control information or may be based on the amplitude of the control information.

In this way, the receiver 32 and the instruction device 34 read the control signal including the control information for the device to be controlled 20 and control the device to be controlled 20.

The drive current source 36 supplies power necessary to drive the device to be controlled 20. The drive current source 36 draws in power from the electric wire 13 and supplies the power to the device to be controlled 20 according to the instruction signal Cd from the instruction device 34 to drive the device to be controlled 20. When the instruction device 34 directly outputs power for the device to be controlled 20 to perform a specified operation as the instruction signal Cd, the drive current source 36 and the instruction device 34 may be integrated together.

An operation of the drive control system 1 having the configuration described above will be described. The power supply 10 supplies power of a power frequency $f_0$. The control information addition apparatus 14 transmits control information to each device to be controlled 20. Here, it is assumed that the control information addition apparatus 14 transmits three types of control information, whose control information frequencies are $f_1$, $f_2$, and $f_3$, respectively, to a certain device to be controlled 20. The number of pieces of control information may be three or more. The control information means that when the drive control apparatus 30 that controls the device to be controlled 20 receives signals of frequencies $f_1$, $f_2$, and $f_3$ from the electric wire 12, the drive control apparatus 30 sets the statuses of the device to be controlled 20 to A, B, and C, respectively.

For example, when the device to be controlled 20 is a motor, the status A is that the motor rotates by one-half the power from the power supply 10, the status B is that the motor rotates by the power from the power supply 10, and the status C is that the rotation of the motor is stopped. Therefore, the control information of the control information frequencies $f_1$, $f_2$, and $f_3$ are not superimposed on the electric wire 12.

The detection current source 42 of the drive control apparatus 30 that controls the device to be controlled 20 flows a current of frequency $f_d$ through the magnetic element 40. At this time, a difference between $f_d$ and each of $f_1$, $f_2$, and $f_3$ is set to be smaller than or equal to $f_c$. It is assumed that $f_c$ is sufficiently smaller than the power frequency $f_0$. Here, $f_c$ is a cut-off frequency of the filter 44. Any of $f_1$, $f_2$, $f_3$, and $f_d$ is a frequency sufficiently away from the power frequency $f_0$.

The power supply 10 supplies power through the electric wire 12. The control information addition apparatus 14 superimposes a signal of frequency $f_1$ on the electric wire 12. The power from the electric wire 12 is transmitted to the device to be controlled 20 through the transformer 16.

The drive control apparatus 30 of the magnetic element 40 is arranged adjacent to the electric wire 13 so that the both current terminals 40a are arranged along a direction in which the current of the electric wire 13 through the transformer 16 flows. Therefore, the magnetic element 40 receives the magnetic field H from the electric wire 13 in a direction perpendicular to a direction of the current terminals 40a.

The current of the frequency $f_d$ flowing through the magnetic element 40 is affected by the magnetic field H. Then, a product of the control information frequency $f_1$ and the detection frequency $f_d$ is obtained at the voltage terminal 40v of the magnetic element 40. In other words, a signal of frequencies of $f_d$–$f_1$ and $f_d$+$f_1$ is obtained. Of course, a signal of $f_d$–$f_0$ and $f_d$+$f_0$, which is a product of the power frequency $f_0$ and the detection frequency $f_d$, is also obtained.

The smallest of these signals is the signal of $f_d$–$f_1$. Only the signal of $f_d$–$f_1$ passes through the cut-off frequency $f_c$ of the filter 44. The signal of $f_d$–$f_1$ is amplified by the amplifier 46.

The instruction device 34 issues an instruction according to an output signal from the amplifier 46 (which is called a "detection signal") to the drive current source 36 by using the instruction signal Cd. The drive current source 36 supplies one half of power obtained through the transformer 16 to the device to be controlled 20. A relationship where a low frequency signal obtained as a product of the control information frequency and the detection frequency passes through the filter 44 is also established in the same manner even when the control information frequency is $f_2$ or $f_3$.

In other words, it is possible to obtain a signal having a frequency of $f_d$–$f_1$, $f_d$–$f_2$, or $f_d$–$f_3$ from the amplifier 46. The instruction device 34 transmits the instruction signal Cd corresponding to the frequency to the drive current source 36, and thereby the device to be controlled 20 is controlled.

In this way, the magnetic element 40 of the receiver 32 outputs a voltage of a frequency corresponding to a product of a frequency ($f_0$ to $f_3$) of a signal flowing through the electric wire 12 and the detection frequency $f_d$ of current frown through the magnetic element 40 by the detection current source 42. Therefore, it is possible to perform drive control of the device to be controlled 20 with PLC by determining in advance the relationship between the detection frequency $f_d$ and the control information $f_1$ or the like.

The drive control system 1 according to the present invention is a system that controls the device to be controlled 20 from the power supply side. However, when the device to be controlled 20 has a redundant space and an apparatus for transmitting information can be arranged in the redundant space, it is possible to perform communication also in the opposite direction by arranging the receiver 32 on the power supply side.

Second Embodiment

Figure 3:
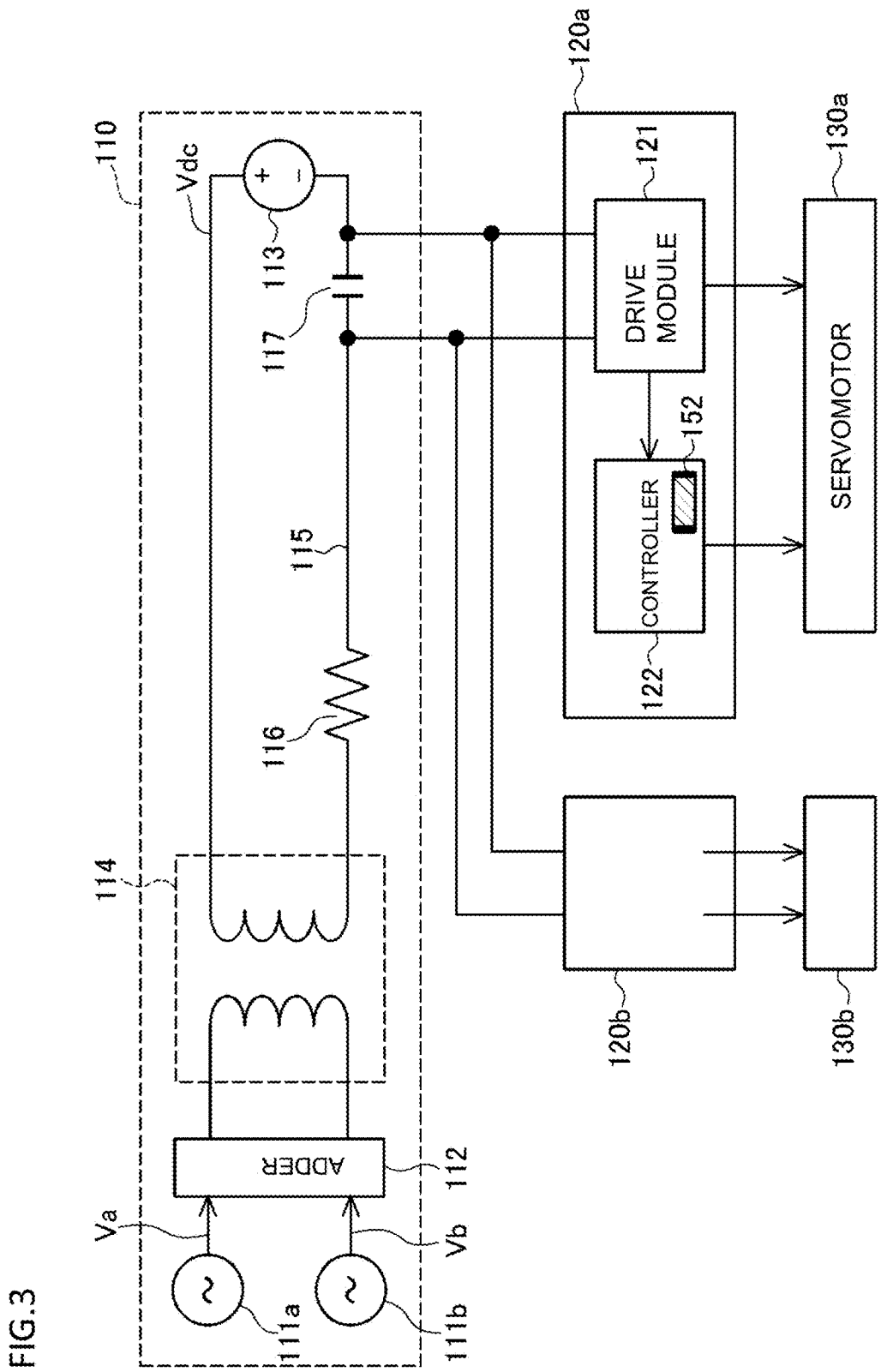
FIG. 3 is a block diagram illustrating a schematic configuration of a drive control system according to a second embodiment.

FIG. 3 is a block diagram illustrating a schematic configuration of a drive control system according to a second embodiment. Hereinafter, differences from the first embodiment will be mainly described. A drive control system includes a transmitting apparatus 110 and a plurality of (in the present example, two) drive control apparatuses 120a and 120b. Servomotors 130a and 130b, which are devices to be controlled, are driven and controlled by the drive control apparatuses 120a and 120b, respectively. A PWM signal is inputted into the servomotors 130a and 130b as a control signal and the servomotors 130a and 130b rotate by an angle according to a duty ratio of the PMW signal.

The drive control system of the present embodiment supplies power to the servomotors 130a and 130b and drives the servomotors 130a and 130b. Further, the drive control system controls the servomotors 130a and 130b to realize a desired rotation angle.

Unique detection frequencies fa0 (for example, 1,000 Hz) and fb0 (for example, 2,000 Hz) are set in advance to the drive control apparatuses 120a and 120b, respectively. The drive control apparatus 120a drives and controls the servomotor 130a and the drive control apparatus 120b drives and controls the servomotor 130b, so that it can also be said that the detection frequencies fa0 and fb0 are set in the servomotors 130a and 130b, respectively. The detection frequencies fa0 and fb0 are different from each other and are preferably sufficiently away from each other.

The transmitting apparatus 110 generates a transmission signal, where power to drive the servomotors 130a and 130b and two control signals to individually control the servomotors 130a and 130b are superimposed, and transmits the transmission signal to the drive control apparatuses 120a and 120b.

Specifically, the transmitting apparatus 110 includes control signal generators 111a and 111b, an adder 112, a power supply 113, a control information addition apparatus 114, an electric wire 115, a resistor 116, and a capacitor 117.

The control signal generator 111a generates a control signal Va to control the servomotor 130a. The control signal generator 111a is, for example, a function generator and generates a sine wave of frequency fa as the control signal Va. Here, the frequency fa is a frequency close to the detection frequency fa0, is specifically a frequency within a predetermined range with respect to the detection frequency fa0, and is preferably sufficiently away from the detection frequency fb0 of the drive control apparatus 120b. Under this status, a user can arbitrarily set the frequency fa, and a PWM signal of a duty ratio according to the frequency fa is generated by the drive control apparatus 120a, so that it is possible to arbitrarily control the rotation angle of the servomotor 130a.

Similarly, the control signal generator 111b generates a control signal Vb to control the servomotor 130b. The frequency fb of the control signal Vb is a frequency close to the detection frequency fb0, is specifically a frequency within a predetermined range with respect to the detection frequency fb0, and is preferably sufficiently away from the detection frequency fa0 of the drive control apparatus 120a. It is preferable that the frequency fb is sufficiently away from the frequency fa.

The adder 112 frequency-multiplexes the control signal Va and the control signal Vb.

The power supply 113 generates a voltage for transmitting power, in other words, a voltage for driving the servomotors 130a and 130b. In the present embodiment, the power supply 113 generates a DC voltage Vdc (for example, 24 V). However, the power supply 113 may generate an AC voltage.

The control information addition apparatus 114 is, for example, a toroidal core and adds the control signals Va and Vb including an AC component to the DC voltage Vdc. Thereby, a transmission signal where the control signals Va and Vb are superimposed on the DC voltage Vdc is generated.

The electric wire 115 is connected to the control information addition apparatus 114 and transmits the transmission signal to the drive control apparatuses 120a and 120b. The resistor 116 and the capacitor 117 are connected in series between the power supply 113 and the control information addition apparatus 114 on the electric wire 115. In the drive control system according to the present embodiment, the transmission signal includes the DC voltage Vdc and the control signals Va and Vb, so that it is not necessary to provide an electric wire for driving (power line) and an electric wire for control separately from each other.

The impedance of the capacitor 117 for an AC component is low. Therefore, a current It is generated in the electric wire 115 according to the control signals Va and Vb in the transmission signal. Specifically, the current It is represented by the formula (8) below. The formula (8) corresponds to the formula (5), where n=0 to 1, in the first embodiment. Here, Ita0 and Itb0 are values determined by mainly the amplitudes of the control signals Va and Vb and the resistor 116.

$$I_t = I_{ta0} \sin(2\pi f_a t + \theta_a) + I_{tb0} \sin(2\pi f_b t + \theta_b) \quad (8)$$

On the other hand, the impedance of the capacitor 117 for a DC component is high. Therefore, a DC current hardly flows through the electric wire 115. A voltage generated between both ends of the capacitor 117 includes the DC voltage Vdc as a DC component, and the DC voltage Vdc is supplied to the drive control apparatuses 120a and 120b in a wired manner.

Figure 4A:
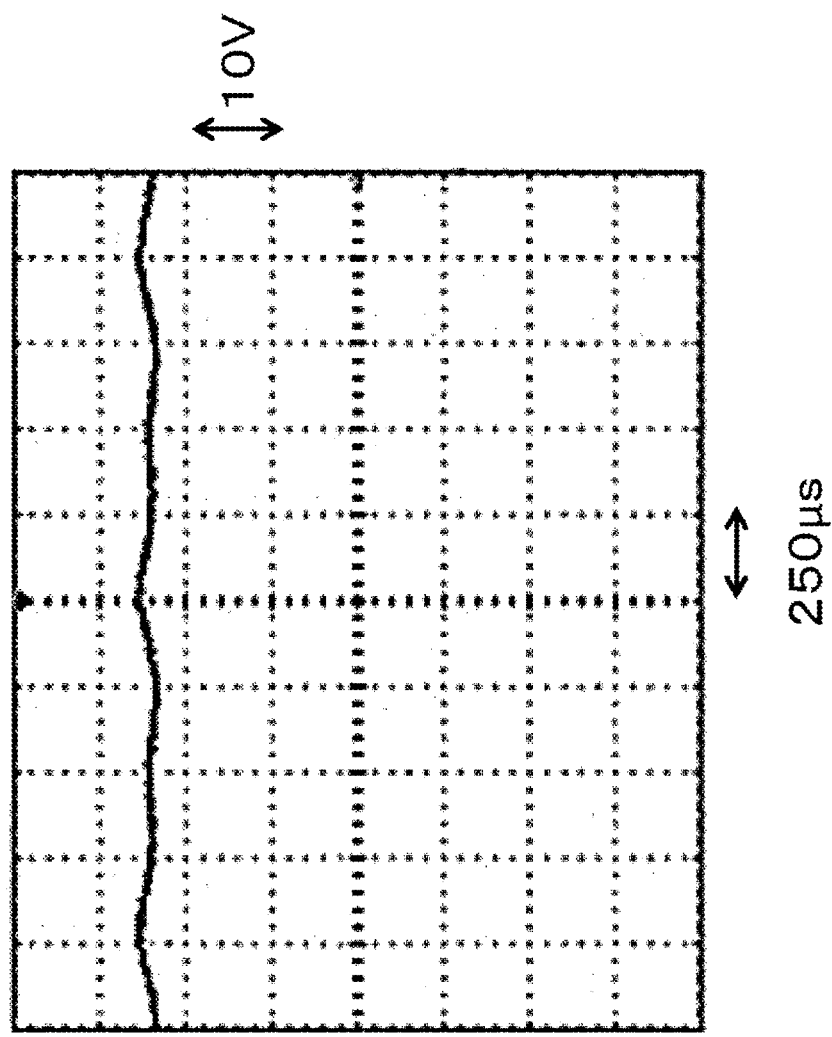
FIG. 4A is a diagram illustrating time variation of a voltage of an electric wire 115.
Figure 4B:
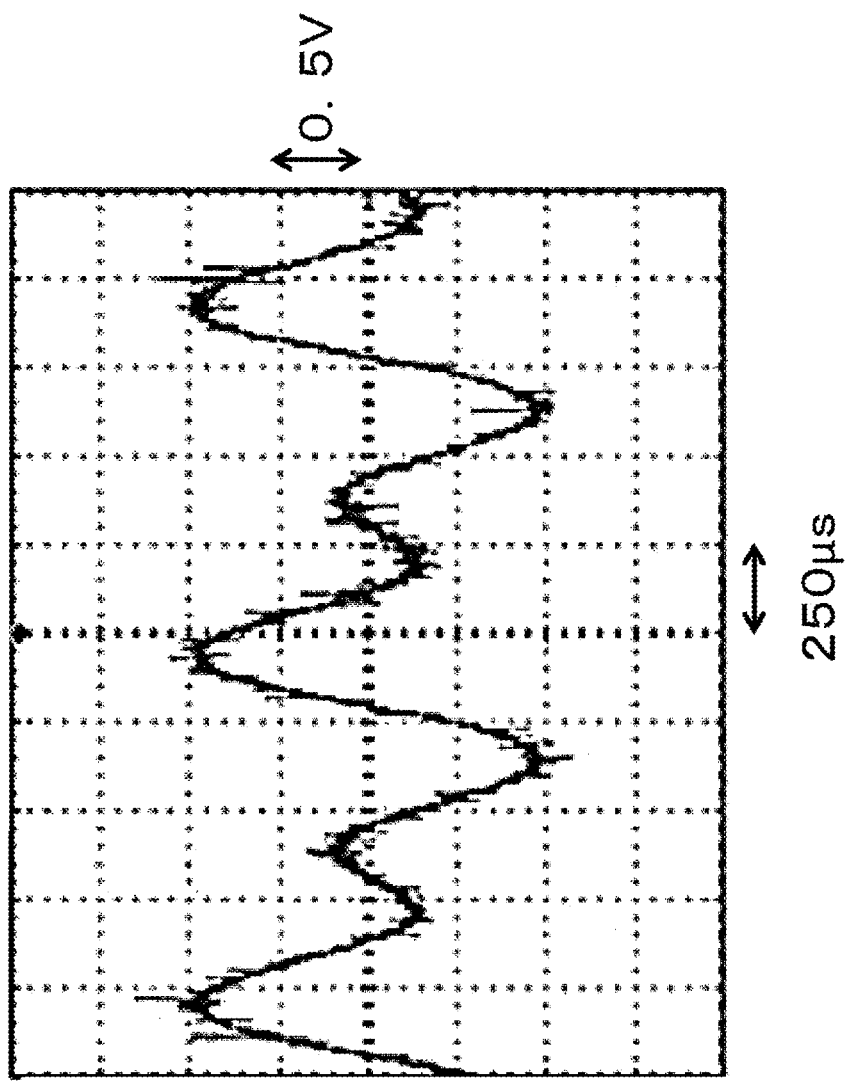
FIG. 4B is an enlarged diagram of FIG. 4A.

FIG. 4A is a diagram illustrating time variation of a voltage of the electric wire 115. FIG. 4B is an enlarged diagram of FIG. 4A. In these diagrams, measurement statuses are Vdc=24V, fa=1,020 Hz, and fb=2,030 Hz. As known from FIG. 4A, an AC component is superimposed on a DC component of 24V in the transmission signal. As known from FIG. 4B, an AC component includes two frequencies, which are frequencies of 1,020 Hz and 2,030 Hz.

Let us return to FIG. 3. The drive control apparatus 120a defines the servomotor 130a out of the servomotors 130a and 130b as a device to be driven and controlled. Similarly, the drive control apparatus 120b defines the servomotor 130b out of the servomotors 130a and 130b as a device to be driven and controlled. The drive control apparatuses 120a and 120b have the same configuration, so that the drive control apparatus 120a will be mainly described in the following description. The drive control apparatus 120a receives the transmission signal through the electric wire 115 and drives and controls the servomotor 130a. The drive control apparatus 120a has a drive module 121 and a controller 122.

The drive module 121 drives the servomotor 130a by using the power supplied from the transmitting apparatus 110. More specifically, the drive module 121 is supplied with the voltage from the transmitting apparatus 110 and generates a DC voltage for driving the servomotor 130a and a DC current for driving the controller 122 by extracting a DC component of the voltage.

The controller 122 has a magnetic element 152. The controller 122 detects the frequency fa from a current flowing through the electric wire 115 by extracting an AC component of the current It flowing through the electric wire 115 and generates a PWM signal for controlling the servomotor 130a according to the frequency fa.

Figure 5:
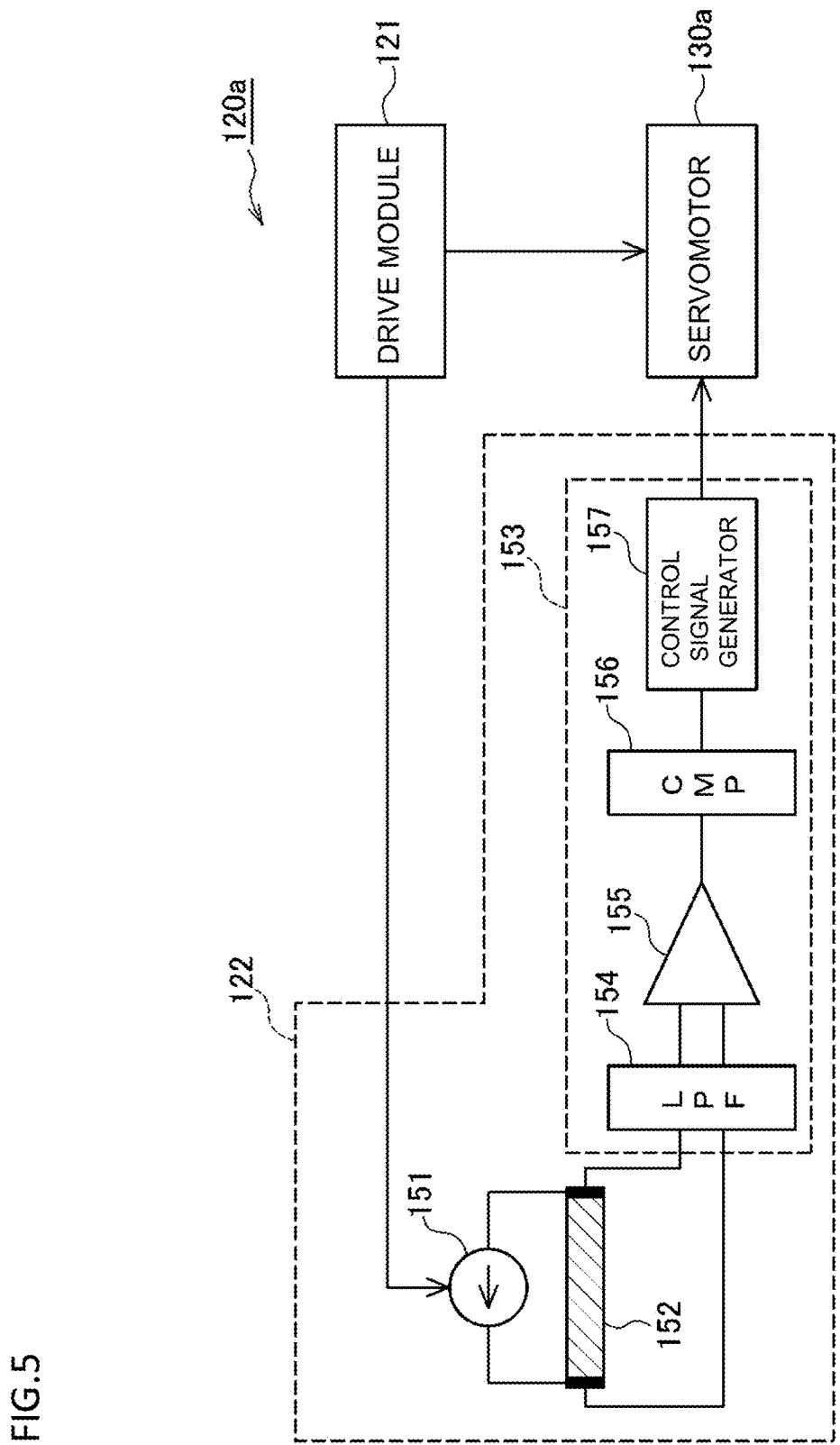

FIG. 5 is a block diagram illustrating an example of an internal configuration of a drive control apparatus 120a.

The drive module 121 in the drive control apparatus 120a generates a DC voltage (for example, 5 V) from a DC component of the transmission signal to drive the servomotor 130a and generates a DC voltage (for example, 24V) to drive the controller 122. It is preferable to use an insulated DC-DC converter as the drive control apparatus 120a. Thereby, it is possible to separate the ground of the power supply 113 from the ground of the servomotor 130a in FIG. 3, so that the electric wire 115 is difficult to be affected by a surge voltage generated from the servomotor 130a.

The controller 122 has a detection current generator 151, a magnetic element 152, and a signal processor 153. The signal processor 153 includes, for example, a low-pass filter 154 (LPF), an amplifier 155, a comparator 156 (CMP), and a control signal generator 157.

The detection current generator 151 is driven by the DC voltage generated by the drive module 121, generates a detection signal Vd, and flows a detection current Id through the magnetic element 152. The frequency of the detection signal Vd is the detection frequency fa0. Although the detection signal Vd may be a sine wave, it is more preferable that the detection signal Vd is a rectangular wave (whose amplitude is, for example, 10 V). Transition of signal of the rectangular wave is steeper than that of the sine wave, so that it is possible to substantially reduce the power consumption of the detection current generator 151.

Hereinafter, it is assumed that the detection signal Vd is a rectangular wave. In this case, the detection signal Vd includes not only the detection frequency fa0 but also a higher harmonic component of the detection frequency fa0. When the detection signal Vd is a rectangular wave, the detection current Id is also a rectangular wave and can be represented by the following formula (9).

$$I_d = I_{d1}\sin 2\pi f_{a0}t + \sum_n I_{dn}\sin(2n\pi f_{a0} + \theta_n) \qquad (9)$$

Here, n is an odd number greater than or equal to three. In the above formula (9), the first term corresponds to the formula (6) in the first embodiment. The second term indicates a higher harmonic component in the rectangular wave. Idn indicates an amplitude of the nth order component. The greater n, the smaller the amplitude Idn.

The magnetic element 152 corresponds to the magnetic element 66 described in the first embodiment. The magnetic element 152 is arranged adjacent to the electric wire 115, so that the magnetic element 152 has a function to multiply the current It flowing through the electric wire 115 and the detection current Id flowing through the magnetic element 152 itself. Therefore, the magnetic element 152 outputs a voltage change ΔVmr according to a product of the current It and the detection current Id. Referring to the formula (7) in the first embodiment, the voltage change ΔVmr has frequency components of (10a) to (10f) below.

$$|fa-fa0| \qquad (10a)$$

$$|fa+fa0| \qquad (10b)$$

$$|fb-fa0| \qquad (10c)$$

$$|fb+fa0| \qquad (10d)$$

$$|fb-n*fa0| \qquad (10e)$$

$$|fb+n*fa0| \qquad (10f)$$

Here, (10e) and (10f) are components resulting from a higher harmonic component in the detection current Id. However, the greater n is, the smaller the amplitude of each frequency component is. The frequency fa is close to the detection frequency fa0, so that |fa-fa0| shown in (10a) is the lowest frequency among these frequencies.

Figure 6:
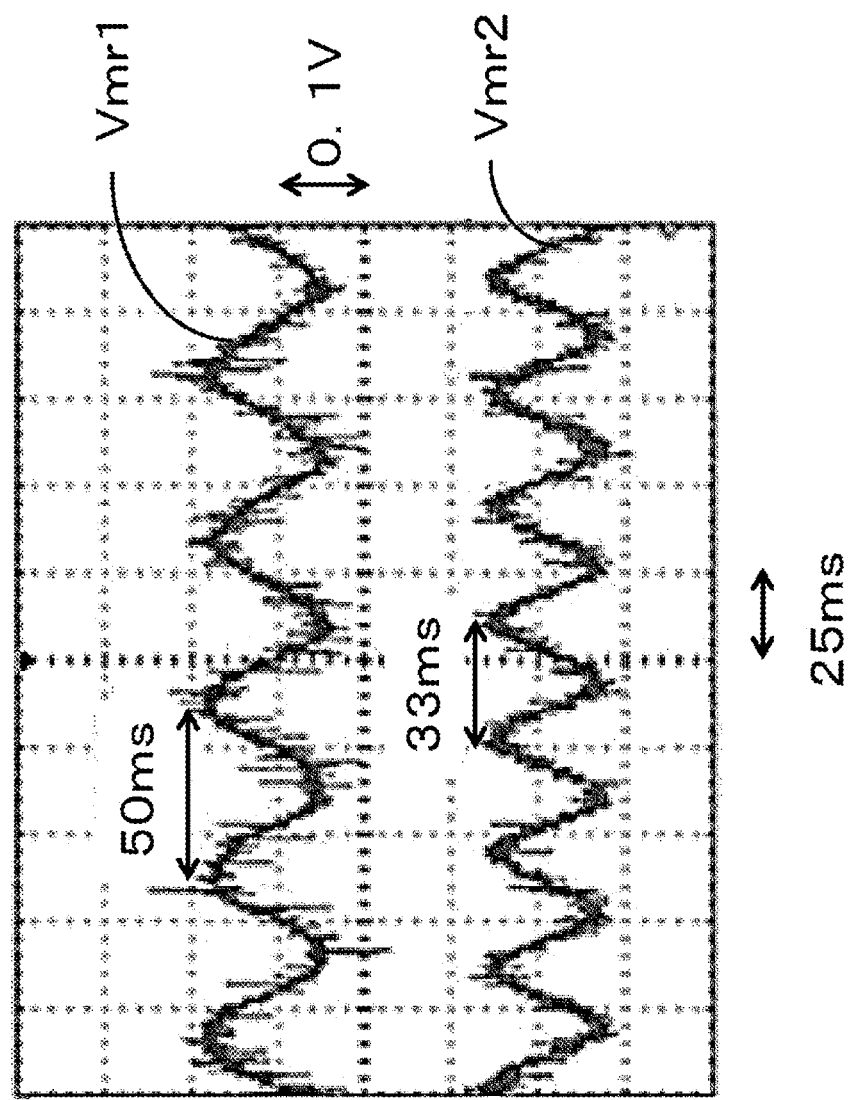
FIG. 6 is a diagram illustrating time variation of an output voltage Vmr of a magnetic element 152.

FIG. 6 is a diagram illustrating time variation of an output voltage Vmr of the magnetic element 152. Vmr1 in FIG. 6 is an output of the magnetic element 152 in the drive control apparatus 120*a*. Regarding Vmr1, fa0=1,020 Hz and fa=1,000 Hz. As known from FIG. 6, a component of period of about 50 ms, that is, a component of frequency of about 20 Hz (=|fa-fa0|) is the largest.

Vmr2 in FIG. 6 is an output of the magnetic element 152 in the drive control apparatus 120*b*. Regarding Vmr2, fb0=2,030 Hz and fb=2,000 Hz. As known from FIG. 6, a component of period of about 33 ms, that is, a component of frequency of about 30 Hz (=|fb-fb0|) is the largest.

Let us return to FIG. 5. The signal processor 153 controls the servomotor 130*a* by detecting the frequency fa from the output ΔVmr from the magnetic element 152 and generating a PMW signal for controlling the servomotor 130*a*. The signal processor 153 may perform analog signal processing. However, it is more preferable that the signal processor 153 converts (AD-converts) an analog signal derived from the output from the magnetic element 152 into a digital signal and then performs digital signal processing. This is because, in particular, when the detection current Id is a sine wave and includes a higher harmonic component, it is possible to reduce influence of noise caused by the higher harmonic component by the AD conversion.

The low-pass filter 154 in the signal processor 153 performs LPF processing on the output AVmr from the magnetic element 152 and extracts only a low frequency component. The cut-off frequency fc of the low-pass filter 154 is higher than |fa-fa0| shown in the above (10a) and lower than the other frequencies. In other words, the frequency fa is set so that a difference between the frequency fa and the detection frequency fa0 is lower than the cut-off frequency fc (this is referred to as "close to"). Therefore, a component of frequency |fa-fa0| is mainly extracted from the output AVmr. However, a higher harmonic component may be slightly outputted to become noise. The output of the low-pass filter 154 is an analog output.

The amplifier 155 is provided as needed. The amplifier 155 amplifies the output from the low-pass filter 154. The output of the amplifier 155 is also an analog output.

The comparator 156 is an example of an AD converter. The comparator 156 converts an analog voltage outputted from the amplifier 155 into a digital value by comparing the analog voltage with a threshold value. As a result, a rectangular wave of frequency |fa-fa0| is obtained as an output from the comparator 156. Even when noise due to a higher harmonic component of the detection current Id (detection voltage Vd) is included in the output from the low-pass filter 154 (that is, the output from the amplifier 155), it is possible to reduce the noise.

The control signal generator 157 detects the frequency fa (to be precise, |fa-fa0|) from a digital signal and generates a PWM signal of a duty ratio according to the frequency fa. The frequency |fa-fa0| is detected in a short time by, for example, measuring a pulse interval of the rectangular wave outputted from the comparator 156. The PMW signal may be generated by, for example, using "PWM mode" of a CCP (Compare/Capture PWM) module built in PIC (Peripheral Interface Controller).

When the generated PWM signal is inputted into the servomotor 130*a*, the servomotor 130*a* rotates by an angle according to the duty ratio of the PWM signal.

Although the drive control apparatus 120*b* has a similar configuration, the drive control apparatus 120*b* uses a rectangular wave of detection frequency fb0 as a detection signal. As a result, a component of frequency |fb-fb0| is extracted by a low-pass filter. Therefore, a PWM signal of a duty ratio according to the frequency fb can be generated and the servomotor 130*b* rotates by an angle according to the duty ratio.

Figure 7:
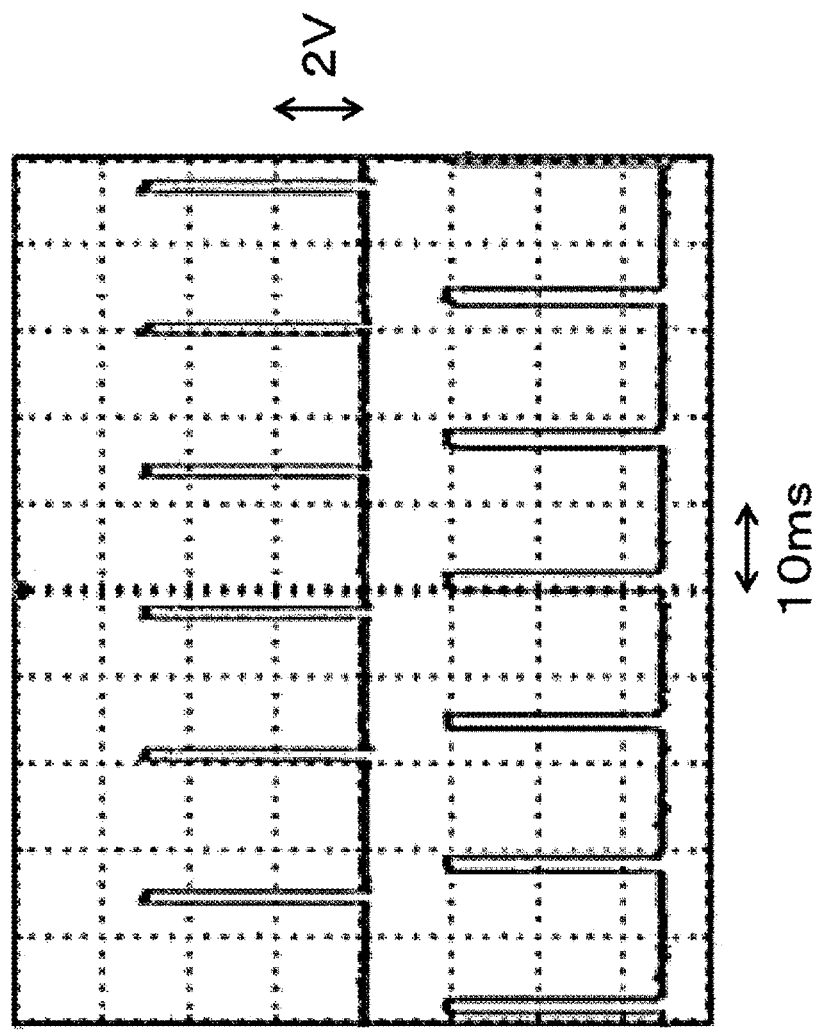
FIG. 7 is a diagram illustrating time variation of PMW signals.

FIG. 7 is a diagram illustrating time variation of PMW signals. PWM1 and PWM2 in FIG. 7 are the PWM signals generated by the control signal generators 157 in the drive control apparatuses 120*a* and 120*b*, respectively. Similar to FIG. 5, it is set so that fa0=1,020 Hz, fa=1,000 Hz, fb0=2,030 Hz, and fb=2,000 Hz. PWM1 and PWM2 have the same period but different duty ratios. It can be understood that PWM signals of duty ratios according to the frequencies fa and fb can be generated in this way.

In the embodiment described above, the frequencies fa and fb of the control signals Va and Vb indicate the control information corresponding to the rotation angles of the servomotors 130*a* and 130*b*. However, instead of the frequencies fa and fb, the amplitudes of the control signals Va and Vb may indicate the control information. Even in this case, the signal processor 153 in the controller 122 of the drive control apparatus 120a can detect the control signal Va for the drive control apparatus 120a because the detection frequency fa0 is close to the frequency fa of the control signal Va. The signal processor 153 may generate a PWM signal of a duty ratio according to the amplitude of the control signal Va.

Further, time where the control signals Va and Vb are superimposed may indicate the control information. In either case, the control signals Va and Vb have information required to control the device to be controlled.

Further, although in FIG. 3, an example is described where the two servomotors 130a and 130b are driven and controlled by using the two drive control apparatuses 120a and 120b, the numbers of the drive control apparatuses and the devices to be controlled are not limited. In any case, a plurality of control signals are superimposed on the DC voltage in the transmission signal, and the control signals correspond to the drive control apparatuses, respectively. A unique detection frequency is set in each drive control apparatus, and the frequency of each control signal may be set by a user to realize a desired control result (for example, a desired rotation angle) in a frequency range close to the detection frequency of a corresponding drive control apparatus.

As described above, in the second embodiment, the frequencies fa and fb of the control signals Va and Vb are detected by using the magnetic element 152, so that it is possible to downsize the drive control apparatuses 120a and 120b. Further, it is possible to reduce the power consumption of the drive control apparatuses 120a and 120b by forming the detection current Id to be flown through the magnetic element 152 into a rectangular wave. Furthermore, it is possible to reduce the noise due to a higher harmonic component of the detection current Id by performing digital signal processing on the output of the magnetic element 152.

Third Embodiment

In the second embodiment described above, one drive control apparatus detects one control signal and controls one device to be controlled. On the other hand, in a third embodiment described below, one drive control apparatus detects a plurality of control signals and controls a plurality of devices to be controlled. Hereinafter, differences from the second embodiment will be mainly described.

Figure 8:
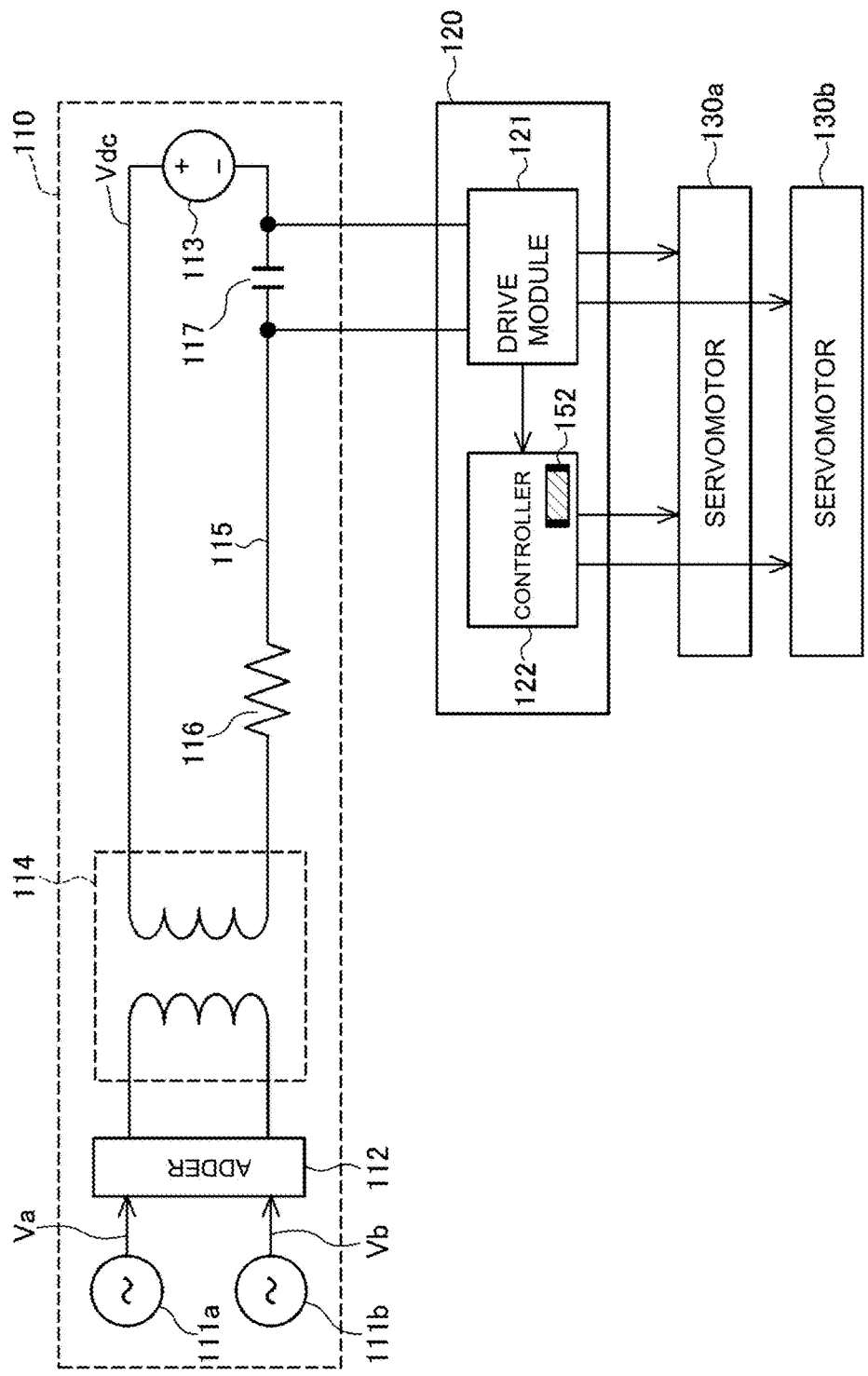
FIG. 8 is a block diagram illustrating a schematic configuration of a drive control system according to a third embodiment.

FIG. 8 is a block diagram illustrating a schematic configuration of a drive control system according to the third embodiment. The drive control system includes the same transmitting apparatus 110 as that in the second embodiment and a drive control apparatuses 120 that drives and controls a plurality of (in the example of FIG. 8, two) servomotors 130a and 130b. A unique detection frequency fa0 is set in the servomotor 130a and a unique detection frequency fb0 is set in the servomotor 130b.

Although an internal configuration of the drive control apparatus 120a is similar to that of the drive control apparatus illustrated in FIG. 5, their operations are different from each other.

Referring to FIG. 5, the drive module 121 generates a DC voltage for driving both the servomotors 130a and 130b and a DC voltage for driving the detection current generator 151 in the controller 122 by using a voltage supplied from the transmitting apparatus 110.

The feature of the present embodiment is an operation of the detection current generator 151.

The detection current generator 151 first generates a detection signal Vd (preferably a rectangular wave) of a detection frequency fa0. Thereby, a detection current Id whose frequency is a detection frequency fa0 is generated and flows through the magnetic element 152. As a result, as described in the second embodiment, the control signal generator 157 in the signal processor 153 detects the control signal Va (as a specific example, detects the frequency fa of the control signal Va). Then, the signal processor 153 generates a PWM signal of a duty ratio according to the frequency fa and controls the servomotor 130a.

Thereafter, the detection current generator 151 generates a detection signal Vd (preferably a rectangular wave) of a detection frequency fb0. Thereby, a detection current Id whose frequency is a detection frequency fb0 is generated and flows through the magnetic element 152. As a result, as described in the second embodiment, the control signal generator 157 in the signal processor 153 detects the control signal Vb (as a specific example, detects the frequency fb of the control signal Vb). Then, the signal processor 153 generates a PWM signal of a duty ratio according to the frequency fb and controls the servomotor 130b.

Whether the signal processor 153 should control the servomotor 130a or the servomotor 130b at a certain point of time is known by cooperation of the detection current generator 151 and the signal processor 153. For example, the detection current generator 151 informs the signal processor 153 that the detection current generator 151 generates the detection signal Vd of the frequency fa0, and accordingly the signal processor 153 controls the servomotor 130a.

When the detection current generator 151 performs control by generating detection currents of each detection frequency in a time-division manner as described above, the servomotor 130a is controlled at first, and then the servomotor 130b is controlled. That is, the control timings of the servomotors 130a and 130b are shifted from each other. If this causes a problem, the control signal generator 157 may appropriately control the timing of generating the PWM signal for the servomotors 130a and 130b, and thereby it is possible to control the servomotors 130a and 130b in synchronization with each other (for example, at the same time). For example, the signal processor 153 continuously detects frequencies of control signals for a predetermined period of time (for example, about several seconds), accumulates the frequencies detected during that period of time, and transmits signals (for example, PWM signals) based on all the accumulated frequencies to the devices to be controlled at the same time. The above cycle may be repeatedly performed.

The accumulation of the frequencies in one cycle may be performed at regular time intervals, or when detection signals are sequentially generated in a time-division manner, the accumulation of the frequencies in one cycle may be performed every time when a series of detection signals has been generated. As a specific example, first, when the frequency fa of the control signal Va is detected, the frequency fa is stored in the signal processor 153, and thereafter, the control signal generator 157 may simultaneously generate the PWM signals for the servomotors 130a and 130b at a time point when the frequency fb of the control signal Vb is detected.

In the present embodiment, the number of devices to be controlled that are driven and controlled by one drive control apparatus 120 is not limited. Even when there are three or more devices to be controlled, a unique detection frequency is set in each device to be controlled. A plurality of control signals corresponding to each device to be controlled are frequency-multiplexed on the transmission signal transmitted from the transmitting apparatus 110. The frequency of each control signal is close to the detection frequency that is set in a corresponding device to be controlled, and is set according to how to control the device to be controlled.

Then, the detection current generator 151 sequentially generates the detection signal Vd of each detection frequency in a time-division manner and flows the detection current Id of the detection frequency through the magnetic element 152. The signal processor 153 can detect the control signal corresponding to a device to be controlled, where the detection frequency of the detection current Id flowing through the magnetic element 152 is set, in a time-division manner.

The control signal generator 157 may simultaneously perform control of the devices to be controlled after detecting all (or a required number) of the control signals as needed.

The drive control system may include a plurality of the drive control apparatuses 120. The drive control apparatuses 120a and 120b described in the second embodiment and the drive control apparatus 120 described in the third embodiment may coexist.

As described above, in the third embodiment, one drive control apparatus 120 detects a plurality of control signals and controls a plurality of devices to be controlled by, for example, generating the detection signals Vd in a time division manner. Therefore, it is possible to further downsize the drive control system.

Hereinafter, a result of examining an operation of the drive control system according to the present invention in an experimental scale will be described as reference examples.

Reference Example 1

Figure 9:
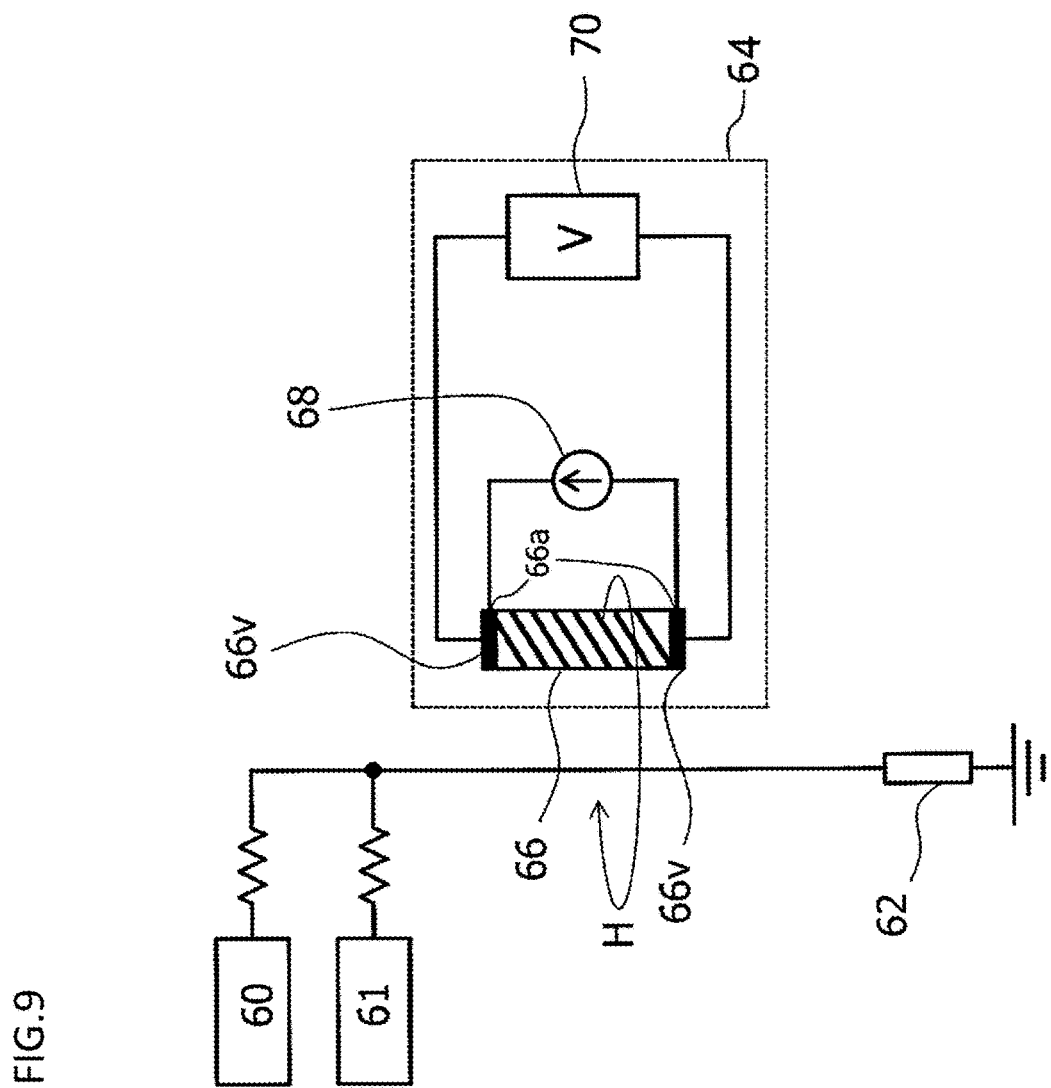
FIG. 9 is a circuit configuration used for verification of retrieving frequency-multiplexed control information.

FIG. 9 illustrates a configuration of a verification circuit. The verification circuit in FIG. 9 measures the magnetic element 66 in the drive control apparatus 30 in FIG. 2 by a voltmeter 70. The verification circuit is also used to measure an output voltage from the magnetic element 152 in the drive control apparatus 120a in FIG. 5.

Control signals of 1992 Hz and 996 Hz are outputted from a power supply 60 and a power supply 61, respectively. These control signals are synthesized and flown through a load 62 (corresponding to the resistor 116 in FIG. 3). Here, the signal of frequency 1992 Hz is defined as a power frequency and the signal of frequency 996 Hz is defined as a control signal. A receiver 64 includes a magnetic element 66, a detection current source 68, and the voltmeter 70. The magnetic element 66 is an element where a NiFe thin film is formed on a substrate and a barber pole pattern is further formed by copper on an upper surface of the NiFe thin film.

The magnetic element 66 having a conductor film of the barber pole pattern indicates the same effect as that of applying in advance a bias magnetic field in a direction perpendicular (lateral) to a current terminal 66a. In other words, when a current is being flown through a copper portion, even when no magnetic field is applied from outside, an operating point is maintained at middle of a variation width of resistance. The detection current source 68 is set to flow a current of 1006 Hz and 0.2 mA through the magnetic element 66.

Figure 10:
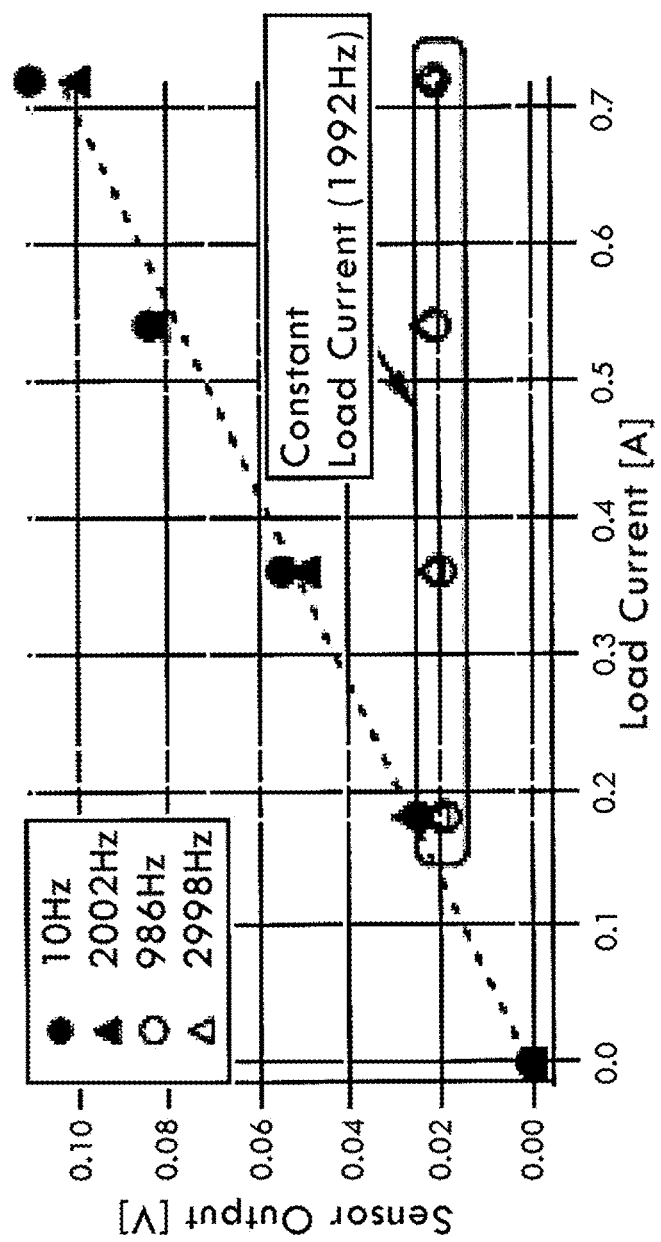
FIG. 10 is a graph illustrating a result of a reference example 1.

In this state, an output of a voltage terminal 66v of the magnetic element 66 was measured by the voltmeter 70 when only the amplitude of signal component of 996 Hz, which is control information, is linearly changed. FIG. 10 illustrates the result of the above. Referring to FIG. 10, the horizontal axis is the amplitude (A) of the control information and the vertical axis is a both-ends voltage (V) of the magnetic element 66. The horizontal axis is represented as "Load Current" and the vertical axis is represented as "Sensor Output".

The detection frequency is 1006 Hz, so that signals of frequency 10 Hz (1006 Hz−996 Hz) and frequency 2002 Hz (1006 Hz+996 Hz) are obtained between the detection frequency and the control information frequency of 996 Hz. Further, 986 Hz (1006 Hz−1992 Hz) and 2998 Hz (1006 Hz+1992 Hz) are obtained between the detection frequency and the power frequency of 1992 Hz.

Referring to FIG. 10, the horizontal axis is a current value (A) of the control information superimposed on the electric wire 12 and the vertical axis is a voltage (V) between the voltage terminals 66v of the magnetic element 66. Output voltages of the signal of 10 Hz and the signal of 2002 Hz obtained from 996 Hz increased along with increase of input currents. At this time, signals of 986 Hz and 2998 Hz obtained from 1992 Hz did not change at all. Thus, by controlling the amplitude of the control information on the power supply side, the device to be controlled 20 can obtain a signal of the control information whose amplitude varies.

Reference Example 2

Figure 11:
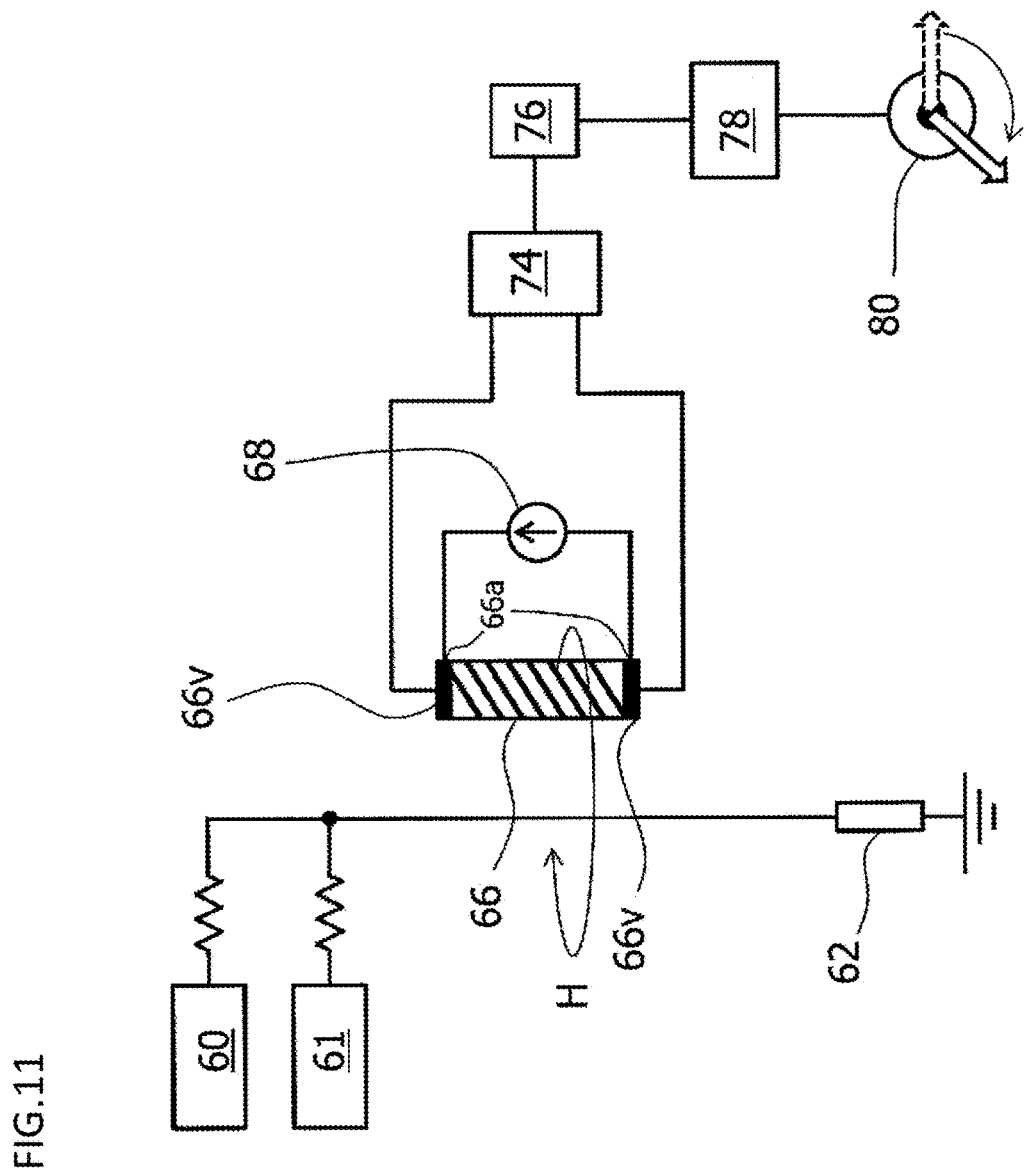
FIG. 11 is a circuit configuration used for verification of actually driving and controlling a servomotor.

FIG. 11 illustrates a verification circuit of the present reference example. The magnetic element 66 and circuits on the left side of the magnetic element 66 are the same as those in the reference example 1. In the present reference example, an instrumentation amplifier 74, a comparator 76, a PIC (Peripheral Interface Controller) 78, and a servomotor 80 are connected to the voltage terminals 66v of the magnetic element 66. The instrumentation amplifier 74 is an integrated unit of a filter and an amplifier. The cut-off frequency fc is 50 Hz. An amplification factor is set so that an output amplitude from both ends of the voltage terminal 66v of the magnetic element 66 is 5 V or more.

An instruction device and a drive current source are composed of the comparator 76 and the PIC 78. As the PIC 78, a reciprocal type PIC is used.

As correspondence relationships with FIG. 5, the low-pass filter 154 and the amplifier 155 in FIG. 5 correspond to the instrumentation amplifier 74 in FIG. 11, the comparator 156 in FIG. 5 corresponds to the comparator 76 in FIG. 11, the control signal generator 157 in FIG. 5 corresponds to the PIC 78 in FIG. 10, and the servomotor 130a in FIG. 5 corresponds to the servomotor 80 in FIG. 11.

The comparator 76 clips a signal by 0 to 5 V. Therefore, when a sufficiently large sine wave is inputted, it is possible to obtain a rectangular shaped signal. The reciprocal type PIC 78 measures a wavelength of an output signal of the comparator 76 by an internal clock and converts the wavelength into a frequency. Then, the PIC 78 outputs a PWM (pulse width modulation) signal according to the frequency. Therefore, the comparator 76 and the PIC 78 play roles of an instruction device that issues an instruction for outputting a drive current and a drive current source based on an output signal of the magnetic element 66 through which a detection current flows.

The servomotor (GWSNRH/BB/F) 80 is used as the device to be controlled. The servomotor 80 rotates a rotating shaft by a given angle by using an inputted PWM signal as a drive power. In the reference example 2, signals from 1012 Hz to 1037 Hz are used as control signals, and 1000 Hz is used as a detection frequency $f_d$. The detection current frequency $f_d$ is 1000 Hz, so that it is possible to obtain a control signal of 12 Hz to 37 Hz as a difference from the control information frequency. The PWM signal is adjusted so that the rotating shaft of the servomotor 80 rotates from 0 degrees to 180 degrees by using the control signal as one command for every 1 Hz. In other words, a rotary angle of about 7 degrees is controlled for every 1 Hz. The power frequency is 2000 Hz. The control information is outputted from the power supply 60. Power is outputted from the power supply 61.

Figure 12:
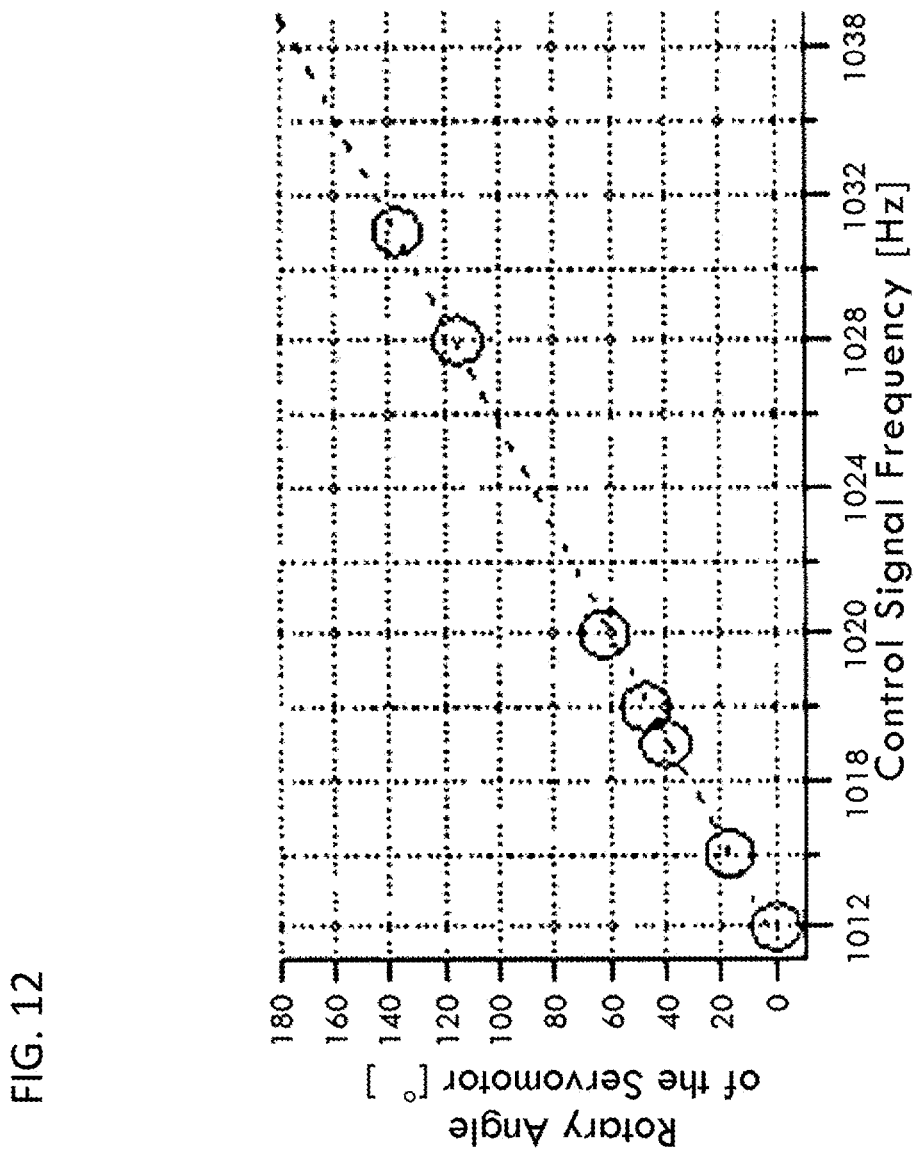
FIG. 12 is a graph illustrating a result of controlling the servomotor by the circuit of FIG. 10.

FIG. 12 illustrates a verification result. Referring to FIG. 12, the horizontal axis is the control information (written as "Control Signal Frequency") (Hz) and the vertical axis represents the rotary angle of the servomotor 80 (written as "Rotary Angle of the Servomotor"))(°. When changing the frequency of the signal from the power supply 60, which is the control information, the rotary angle of the servomotor 80 changes. As it is clear from FIG. 12, the frequency of the signal from the power supply 60 and the rotary angle of the servomotor 80 changed linearly.

Response time from when the signal of the control information is transmitted to when the servomotor 80 responds is 250 ms which is sufficiently short (response speed is fast). The operation of the drive control system according to the present invention could be verified by the present embodiments.

In each embodiment, it is possible to apply various elements (referred to as magnetic field response elements), whose impedance varies in response to a magnetic field generated in an electric wire, instead of the magnetic elements 66 and 152. Specifically, it is possible to apply a Hall element, a magnetic semiconductor element, a GMR (giant magnetoresistance) effect element, a TMR (tunnel magnetoresistance) effect element in addition to a magnetic film. When any one of the magnetic field response elements is used, it is possible to detect the control signal from the power supply side (the transmitting apparatus) by flowing the detection current of the detection frequency through the element, so that it is possible to downsize the drive control apparatus and the drive control system.

For example, aspects as described below are considered based on the embodiments described above.

APPENDIX 1

A drive control apparatus, where one or more devices to be controlled are connected to an electric wire, and power and control information that is assigned to a frequency different for each of the devices to be controlled and is frequency-multiplexed are supplied from a power supply side through the electric wire, and which controls the devices to be controlled by the control information, the drive control apparatus including:

a receiver that reads the control information frequency-multiplexed on the electric wire;

a drive current source that supplies a drive current to the devices to be controlled; and an instruction device that transmits a current value according to the control information to the drive current source.

APPENDIX 2

The drive control apparatus according to appendix 1, wherein
the receiver includes
a magnetic element arranged adjacent to the electric wire,
a detection current source that flows a current of a characteristic frequency through the magnetic element, and
an amplifier that measures an output voltage of the magnetic element.

APPENDIX 3

The drive control apparatus according to appendix 1 or 2, wherein
the instruction device counts a frequency outputted by the receiver and transmits information of a value of a current to be flown through the devices to be controlled to the drive current source.

APPENDIX 4

The drive control apparatus according to appendix 1 or 2, wherein
the instruction device transmits information of a value of a current to be flown through the devices to be controlled, the value corresponding to an amplitude value of a signal outputted by the receiver to the drive current source.

APPENDIX 5

The drive control apparatus according to any one of appendixes 1 to 4, wherein
the drive current source flows a drive current according to control information transmitted from the instruction device through the devices to be controlled.

APPENDIX 6

The drive control system including:
a power supply that transmits a current of a characteristic frequency;
an electric wire connected to the power supply;
a control information addition apparatus that superimposes control information on a current flowing through the electric wire;
the drive control apparatus according to any one of appendixes 1 to 5; and
a device to be controlled that is controlled by the drive control apparatus.

INDUSTRIAL APPLICABILITY

The drive control apparatus according to the present invention can be preferably used to control a robot and electrically-powered equipment of a vehicle.

REFERENCE SIGNS LIST

1 Drive control system
10 Power supply
12, 13 Electric wire
14 Control information addition apparatus
16 Transformer
20 Device to be controlled
30 Drive control apparatus
32 Receiver
34 Instruction device
36 Drive current source
40 Magnetic element
40*a* Current terminal
40*v* Voltage terminal
42 Detection current source 44 Filter
46 Amplifier
60 Power supply
61 Power supply
62 Load
64 Receiver
66 Magnetic element
66a Current terminal
66v Voltage terminal
68 Detection current source
70 Voltmeter
74 Instrumentation amplifier
76 Comparator
78 PIC
80 Servomotor
Cd Instruction signal
110 Transmitting apparatus
111a, 111b Control signal generator
112 Adder
113 Power supply
114 Control information addition apparatus
115 Electric wire
116 Resistor
117 Capacitor
120, 120a, 120b Drive control apparatus
121 Drive module
122 Controller
130a, 130b Servomotor
151 Detection current generator
152 Magnetic element
153 Signal processor
154 Low-pass filter
155 Amplifier
156 Comparator
157 Control signal generator The present application relates to a drive control apparatus and drive control system comprising the same.

The invention claimed is:

1. A drive control system that comprises a transmitting apparatus and a plurality of drive control apparatuses and drives and controls a plurality of devices to be controlled, wherein
the transmitting apparatus comprises:
a control information addition apparatus that frequency-multiplexes a plurality of control signals to produce a plurality of frequency-multiplexed control signals, and
an electric wire that supplies power and the plurality of frequency-multiplexed control signals to the plurality of drive control apparatuses,
detection frequencies different from each other are set in the plurality of devices to be controlled, respectively,
the plurality of frequency-multiplexed control signals correspond to the plurality of devices to be controlled, respectively,
a frequency of each of the plurality of frequency-multiplexed control signals is within a predetermined range with respect to a detection frequency set in a corresponding device to be controlled,
each of the plurality of drive control apparatuses drives and controls a target device among the plurality of devices to be controlled and comprises:
a driver that drives the target device by using the power,
a detection current generator that generates a detection current whose frequency is a detection frequency set in the target device,
a magnetic field response element in which the detection current flows, an impedance of the magnetic field response element varying in response to a magnetic field generated around the electric wire, and
a signal processor that detects a control signal of the plurality of frequency-multiplexed controls signals, the control signal corresponding to the target device based on an output from the magnetic field response element and controls the target device based on the detected control signal, and
a detection frequency of a detection current generated by the detection current generator in one drive control apparatus among the plurality of drive control apparatuses is different from a detection frequency of a detection current generated by the detection current generator in another drive control apparatus among the plurality of drive control apparatuses.

2. The drive control system according to claim 1, wherein the detection current generator generates the detection current of a rectangular wave.

3. The drive control system according to claim 1, wherein the magnetic field response element generates an output according to a multiplication result of a value of a current flowing through the electric wire and a value of the detection current.

4. The drive control system according to claim 1, wherein the signal processor detects the control signal by performing digital signal processing.

5. The drive control system according to claim 1, wherein the signal processor comprises:
a low-pass filter that extracts a low frequency component from the output from the magnetic field response element, and
an analog-to-digital(AD) converter that converts an output from the low-pass filter into a digital signal.

6. The drive control system according to claim 5, wherein the target device controlled by each of the plurality of drive control apparatuses is controlled according to a frequency of the control signal, and
the signal processor of each of the plurality of drive control apparatuses detects the frequency of the control signal by measuring a pulse interval of an output from the AD converter.

7. The drive control system according to claim 1, wherein the output from the magnetic field response element comprises:
a component whose frequency is sum of the detection frequency of the detection current flowing through the magnetic field response element and each of the frequencies of the plurality of frequency-multiplexed control signals, and
a component whose frequency is difference between the detection frequency of the detection current flowing through the magnetic field response element and each of the frequencies of the plurality of frequency-multiplexed control signals, and
the signal processor comprises a low-pass filter that mainly extracts a lowest frequency component from the output from the magnetic field response element.

8. A drive control apparatus that receives power and a plurality of frequency-multiplexed control signals through an electric wire and drives and controls a device to be controlled, wherein
a detection frequency is set in the device to be controlled,
one of the plurality of frequency-multiplexed control signals is a control signal corresponding to the device to be controlled and a frequency of the control signal is within a predetermined range with respect to the detection frequency, and the drive control apparatus comprising:
a driver that drives the device to be controlled by using the received power,
a detection current generator that generates a rectangular-wave detection current whose frequency is the detection frequency,
a magnetic field response element in which the rectangular-wave detection current flows, an impedance of the magnetic field response element varying in response to a magnetic field generated around the electric wire, and
a signal processor that detects the control signal corresponding to the device to be controlled from an output from the magnetic field response element and controls the device to be controlled based on the detected control signal.

9. The drive control apparatus according to claim 8, wherein the magnetic field response element generates an output depending on a multiplication result of a value of a current flowing through the electric wire and a value of the detection current.

10. The drive control apparatus according to claim 8, wherein the signal processor detects the control signal by performing digital signal processing.

11. The drive control apparatus according claim 8, wherein
the signal processor comprises:
a low-pass filter that extracts a low frequency component from the output from the magnetic field response element, and
an analog-to-digital (AD) converter that converts an output from the low-pass filter into a digital signal.

12. The drive control apparatus according to claim 11, wherein
the device to be controlled is controlled according to a frequency of the control signal, and
the signal processor detects the frequency of the control signal by measuring a pulse interval of an output from the AD converter.

13. The drive control apparatus according to claim 8, wherein
the output from the magnetic field response element comprises:
a component whose frequency is sum of the detection frequency of the detection current flowing through the magnetic field response element and each of the frequencies of the plurality of frequency-multiplexed control signals, and
a component whose frequency is difference between the detection frequency of the detection current flowing through the magnetic field response element and each of the frequencies of the plurality of frequency-multiplexed control signals, and
the signal processor comprises a low-pass filter that mainly extracts a lowest frequency component from the output from the magnetic field response element.

14. A drive control system comprising:
the drive control apparatus according to claim 8; and
a transmitting apparatus comprising a control information addition apparatus and an electric wire, the control information addition apparatus frequency-multiplexing a plurality of control signals to produce the plurality of frequency-multiplexed control signals, the electric wire supplying power and the plurality of frequency-multiplexed control signals to the drive control apparatus.

15. A drive control apparatus that receives power and a plurality of frequency-multiplexed control signals through an electric wire and drives and controls a first to an nth (n is an integer greater than or equal to 2) devices to be controlled, wherein
a first to an nth detection frequencies different from each other are set in the first to the nth devices to be controlled, respectively,
a first to an nth control signals of the plurality of frequency-multiplexed control signals correspond to the first to the nth devices to be controlled, respectively,
a frequency of the kth (k is an integer greater than or equal to 1 and smaller than or equal to n) control signal is within a predetermined range with respect to a kth detection frequency,
the drive control apparatus comprising:
a driver that drives the first to the nth devices to be controlled by using the received power,
a detection current generator that generates a detection current whose frequency is the first to the nth detection frequencies,
a magnetic field response element in which the detection current flows, an impedance of the magnetic field response element varying in response to a magnetic field generated around the electric wire, and
a signal processor that detects the first to the nth control signals from an output from the magnetic field response element and controls the first to the nth devices to be controlled based on the detected first to nth control signals, respectively.

16. The drive control apparatus according to claim 15, wherein
the detection current generator generates a detection current whose frequency is the first to the nth detection frequencies in a time-division manner, and
the signal processor detects the kth control signal when a detection current whose frequency is the kth detection frequency is generated.

17. The drive control apparatus according to claim 16, wherein the signal processor detects the first to the nth control signals in a time-division manner and adjusts control timing of the first to the nth devices to be controlled.

18. The drive control apparatus according to claim 15, wherein the detection current generator generates the detection current of a rectangular wave.

19. The drive control apparatus according to claim 15, wherein the magnetic field response element generates an output depending on a multiplication result of a value of a current flowing through the electric wire and a value of the detection current.

20. The drive control apparatus according to claim 15, wherein the signal processor detects the first to the nth control signals by performing digital signal processing.

21. The drive control apparatus according to claim 15, wherein
the signal processor comprises:
a low-pass filter that extracts a low frequency component from the output from the magnetic field response element, and
an analog-to-digital (AD) converter that converts an output from the low-pass filter into a digital signal.

22. The drive control apparatus according to claim 21, wherein
the first to the nth devices to be controlled are controlled according to frequencies of the first to the nth control signals, and the signal processor detects the frequencies of the control signals by measuring a pulse interval of an output from the AD converter.

23. The drive control apparatus according to claim 15, wherein
the output from the magnetic field response element comprises:
a component whose frequency is sum of the detection frequency of the detection current flowing through the magnetic field response element and each of the frequencies of the plurality of frequency-multiplexed control signals, and
a component whose frequency is difference between the detection frequency of the detection current flowing through the magnetic field response element and each of the frequencies of the plurality of frequency-multiplexed control signals, and
the signal processor comprises a low-pass filter that mainly extracts a lowest frequency component from the output from the magnetic field response element.

24. A drive control system comprising:
the drive control apparatus according to claim 15; and
a transmitting apparatus comprising a control information addition apparatus and an electric wire, the control information addition apparatus frequency-multiplexing a plurality of control signals to produce the plurality of frequency-multiplexed control signals, the electric wire supplying power and the plurality of control signals to the drive control apparatus.

* * * * *